United States Patent [19]

Cimperman et al.

[11] Patent Number: 5,577,439
[45] Date of Patent: Nov. 26, 1996

[54] APPARATUS FOR PITTING PRUNES OR DATES

[75] Inventors: Frederick J. Cimperman, Dublin; Klaus Silbermann, Sunol, both of Calif.

[73] Assignee: Ashlock Company, a Division of Vistan Corporation, San Leandro, Calif.

[21] Appl. No.: 620,252

[22] Filed: Mar. 22, 1996

[51] Int. Cl.⁶ .................. A23N 4/00; A23N 4/08
[52] U.S. Cl. ............... 99/549; 99/557; 99/561; 99/565; 198/384; 198/397
[58] Field of Search ............ 99/485, 537, 547–565; 198/384, 393, 397, 455, 803.9; 426/485

[56] References Cited

U.S. PATENT DOCUMENTS

| | | | |
|---|---|---|---|
| 3,061,070 | 10/1962 | Smith | 198/384 |
| 3,153,473 | 10/1964 | Margaroli | 198/384 |
| 3,273,615 | 9/1966 | Aguilar | 99/561 |
| 3,277,940 | 10/1966 | Henderson, et al. | 99/561 |
| 3,282,396 | 11/1966 | Tomelleri | 198/384 |
| 3,469,612 | 4/1967 | Margaroli et al. | 146/17 |
| 3,556,281 | 1/1971 | Margaroli et al. | 198/397 X |
| 4,382,332 | 5/1983 | Disminge | 99/546 X |
| 4,485,732 | 12/1984 | Goudard | 99/549 |
| 5,024,147 | 6/1991 | Petit, et al. | 99/549 |

*Primary Examiner*—Timothy F. Simone
*Attorney, Agent, or Firm*—Limbach & Limbach L.L.P.

[57] ABSTRACT

An apparatus for pitting articles such as prunes or dates. Each article is loaded between jaws of a chuck assembly which translates between stations along a process path. At a pitting turret, a pitting rubber moves below the chuck assembly, and the chuck assembly and rubber translate together until a pitting knife engages the article and ejects a pit therefrom. The chuck assembly then translates the pitted article to a station where the pitted article is discharged. Preferably, a relatively large number of chuck assemblies are provided, each having a fixed jaw fixedly attached to a chain and a sliding jaw slidably mounted to the fixed portion. A relatively small number of pitting rubbers and one pitting knife for each rubber are mounted to the pitting turret. Preferably, the apparatus includes a cam track (for guiding each sliding jaw) having a portion whose radius varies sinusoidally with position around a feed unit, a portion around the pitting turret for opening and then closing each chuck assembly, and an adjustable portion which can be adjusted to vary the initial maximum spacing between the fixed and sliding jaw of each chuck assembly.

39 Claims, 20 Drawing Sheets

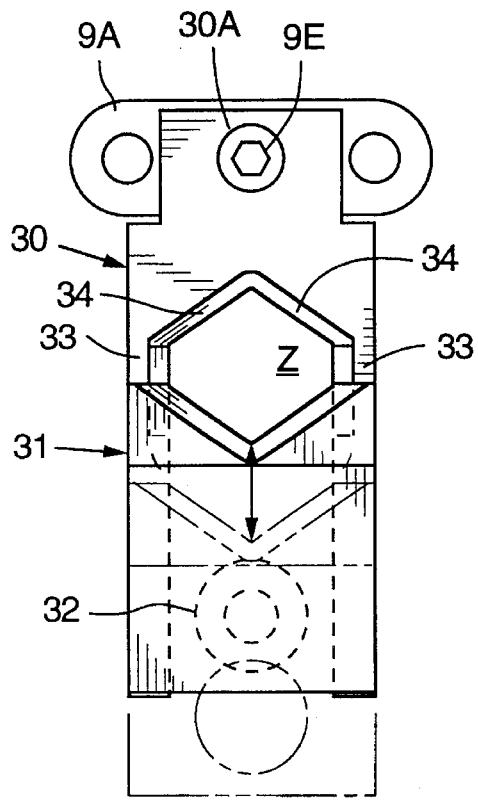
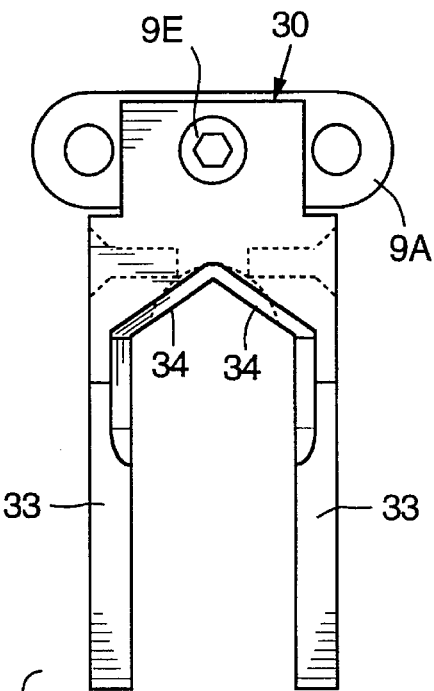
FIG. 7
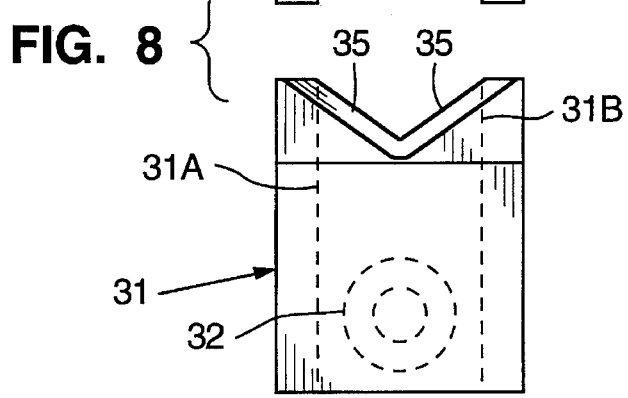
FIG. 8
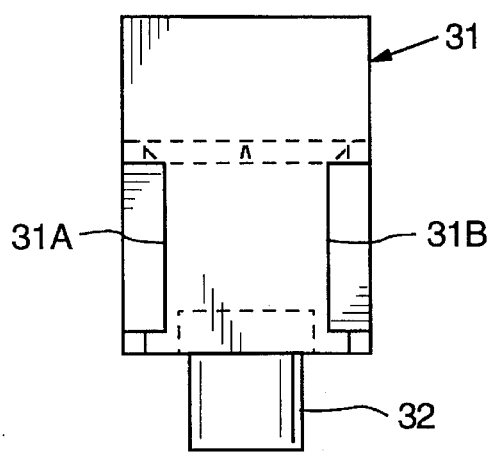
FIG. 9

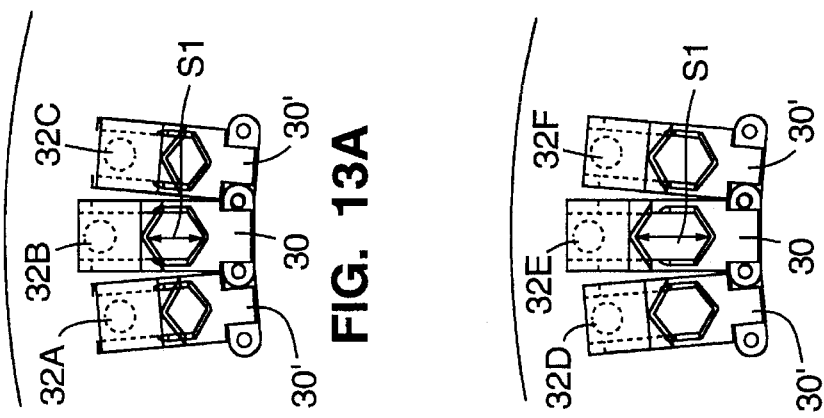
FIG. 13A
FIG. 14A
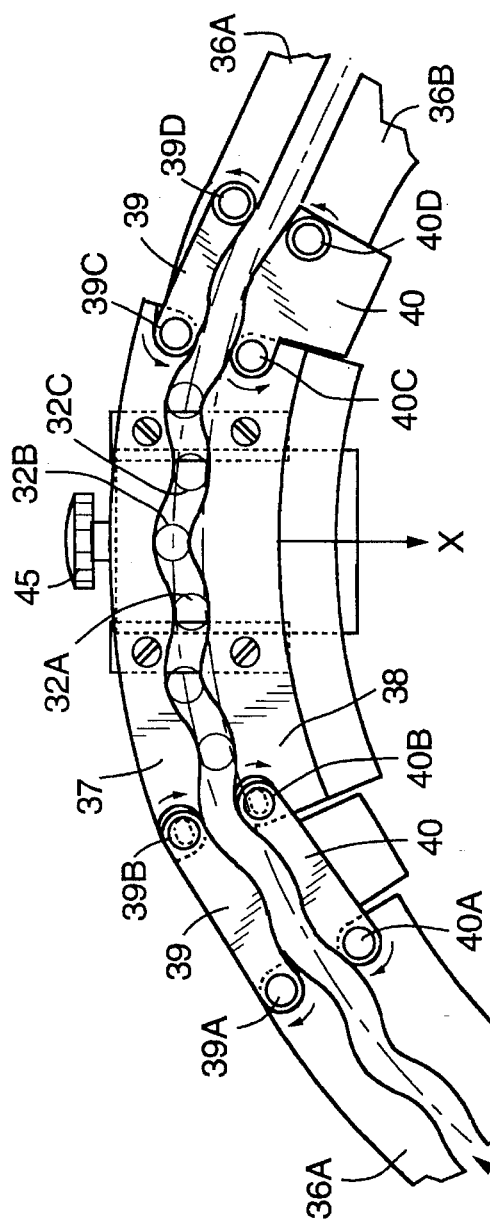
FIG. 13
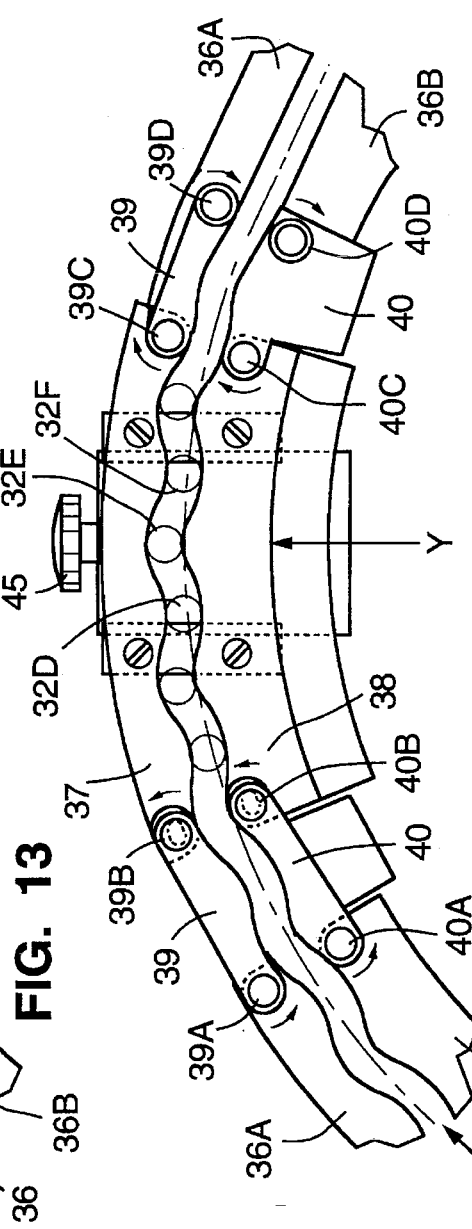
FIG. 14

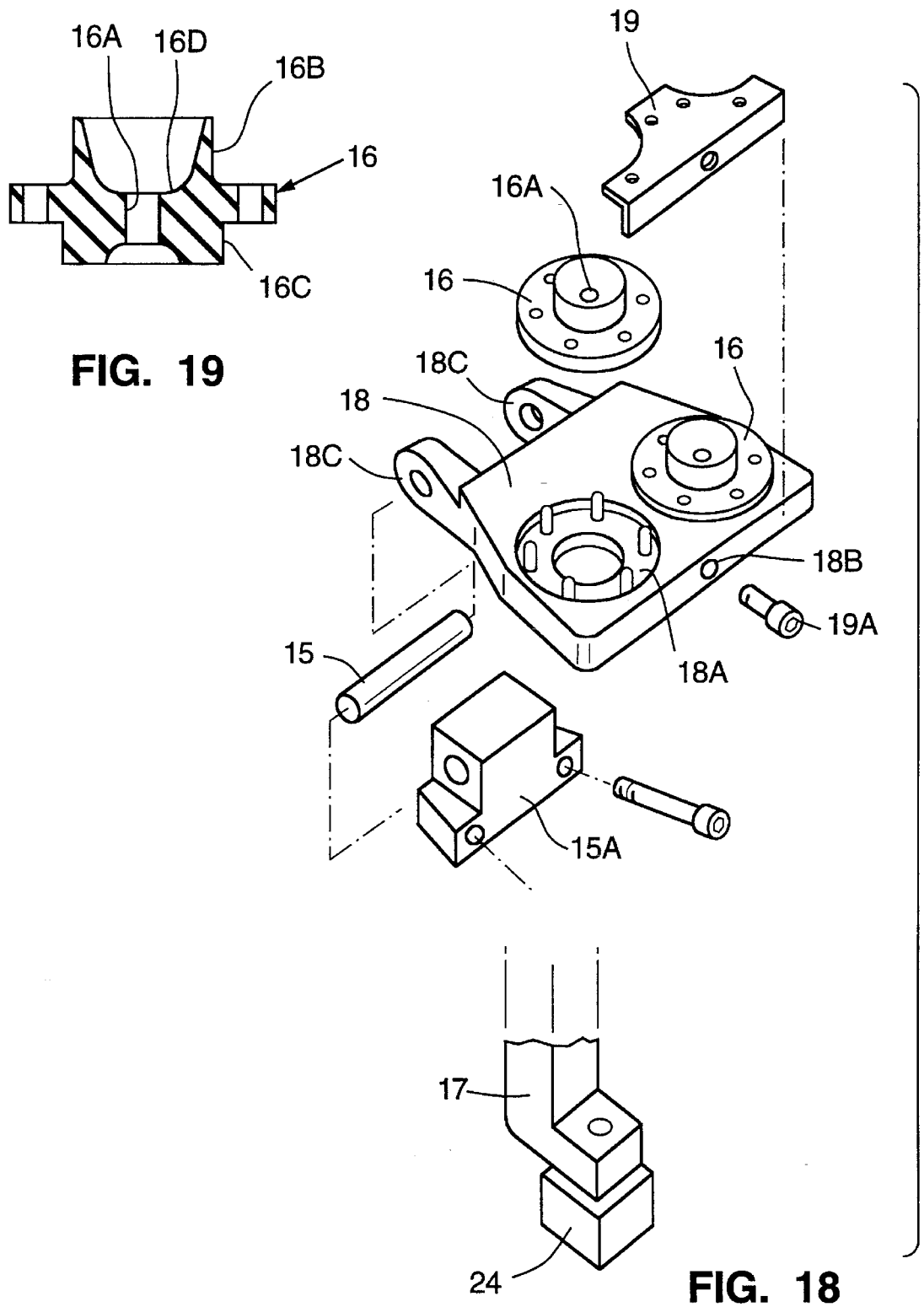

APPARATUS FOR PITTING PRUNES OR DATES

FIELD OF THE INVENTION

The invention is an apparatus for pitting prunes, dates, or other soft articles (e.g., soft, dried fruit having a sticky outer surface). More particularly, the invention is an apparatus for seating an article (e.g., a prune) between chucks of a chain-driven chuck assembly, and moving a pitting knife into engagement with the article to eject a pit from within the article as the chuck assembly is translated around a processing path.

BACKGROUND OF THE INVENTION

One type of conventional prune pitting machine is described in U.S. Pat. No. 3,556,281, issued Jan. 19, 1971. Another conventional prune pitting machine is described in U.S. Pat. No. 3,153,473, issued Oct. 20, 1964. However, such machines have had several limitations and disadvantages, including the following: they have had a large number of components, including a large number of components subject to wear and frequent replacement (e.g., more than three hundred pitting rubbers); they have required complicated and time-consuming maintenance, timing, and repair procedures (e.g., complicated disassembly in order to replace pitting rubbers); and they have required power-consuming means (e.g., fly wheel assembly 166 for vibrating the feed area of the apparatus of U.S. Pat. No. 3,153,473) for properly orienting a prune in each prune carrier.

It had not been known until the present invention how to design an apparatus for pitting articles, such as prunes or dates, in a manner overcoming the noted disadvantages and limitations of conventional pitting apparatus.

SUMMARY OF THE INVENTION

The invention is an apparatus for pitting articles such as prunes or dates. Each article is loaded between chuck jaws of a chain-driven chuck assembly at a feed station, and the chuck assembly then translates the article between stations along a process path. The chuck assembly translates the article to a pitting turret where a pitting rubber moves into position below the chuck assembly. The chuck assembly and pitting rubber then translate together (as a unit) around the pitting turret to a pitting station where a pitting knife engages the article and ejects a pit therefrom. The chuck assembly then translates the pitted article to a discharge station (typically located away from the pitting turret) where the pitted article is discharged from the chuck assembly.

Preferably, the apparatus includes a rotatable feed unit, a rotatable pitting turret, a chain around the feed unit and pitting turret, and a drive assembly for rotating the pitting turret about its axis. A number of chuck assemblies (e.g., seventy or eighty) are attached to the chain, with each chuck assembly having a fixed chuck jaw fixedly attached to the chain and a sliding chuck jaw slidably mounted to the fixed jaw. Preferably, the pitting turret includes a pitting rubber holder to which a relatively small number of pitting rubbers (e.g., eighteen pitting rubbers) are mounted, and a pitting knife for each pitting rubber. Each pitting rubber supports one prune while a pitting knife engages the prune to eject the prune's pit. As the drive assembly rotates the turret, the turret causes the chain to translate, thereby translating each chuck assembly along a closed path around the feed unit and the pitting turret. Also as the drive assembly rotates the turret, each pitting rubber and the knife corresponding thereto translate along a curved (e.g., circular) path around the turret's central axis. A portion of the path of each chuck assembly coincides with a portion of the curved path of one of the pitting rubbers, in the sense that a pitting rubber positioned below the chuck assembly moves together (as a unit) with the chuck assembly along the coinciding portion of their paths (sometimes referred to herein as the "common path" of the chuck assembly and pitting rubber). As each chuck assembly and pitting rubber translate along the common path, a knife which also translates along the common path (above the chuck assembly) moves down through the chuck assembly and rubber (to eject a pit from an article, as the article is held by the chuck assembly and rests on the rubber) and the knife then moves up away from the rubber and pitted article.

The geometry of the preferred embodiment of the pitting turret permits use of a pit detection unit (during the pitting operation) for optically or mechanically monitoring the pitting operation to determine whether a pit is successfully ejected as a result of each engagement of a pitting knife with the article at the pitting station.

In preferred embodiments, the apparatus includes:

a cam track (along which the sliding jaw of each chuck assembly rides), which has a first cam track portion around the feed unit whose radius (radial distance from the hub of the feed unit) varies sinusoidally (or periodically in a manner other than sinusoidally) to induce feeding of product between the jaws of each chuck assembly, a second cam track portion around the pitting turret for opening and then closing each chuck assembly as the chuck assembly translates along the common path, and an adjustable cam track portion at the feed station which is adjustable (relative to the center of the feed unit) to vary the initial maximum spacing between the fixed and sliding jaw of each chuck assembly at the feed station;

an assembly for clearing non-seated articles from the chuck assemblies before they reach the pitting turret;

a second cam track around the pitting turret for controlling the vertical position of each pitting knife;

a third cam track around the pitting turret for pivoting each pitting rubber between a lowered orientation (away from the pitting station) and a raised orientation (at the pitting station); and an ejection means for ejecting each pitted article from its chuck assembly following the pitting operation (preferably the ejection means is an air or water jet, but alternatively it is a knockout wheel).

BRIEF DESCRIPTION OF THE DRAWINGS

FIG. 7 is a top elevational view of a chuck assembly of the FIG. 1 apparatus, in a closed position in which arms 33 of fixed chuck jaw 30 extend into grooves in the sides of sliding chuck jaw 31.

FIG. 8 is a top elevational view of the FIG. 7 chuck assembly, in a disassembled configuration in which arms 33 of the fixed chuck jaw are disengaged from the sliding chuck jaw.

FIG. 9 is an end view of sliding chuck jaw portion 31 of the FIG. 7 chuck assembly.

FIG. 13 is a top elevational view of an adjustable portion of the feed disk assembly of the apparatus of FIG. 24, as it is rotated into a first position for receiving relatively small prunes.

FIG. 13A is a top elevational view of three chuck assemblies as they translate between members 37 and 38, with members 37 and 38 in the first position (shown in FIG. 13).

FIG. 14 is a top elevational view of the adjustable assembly of FIG. 13, as it is rotated into a second position for receiving relatively large prunes.

FIG. 14A is a top elevational view of three chuck assemblies as they translate between members 37 and 38, with members 37 and 38 in the second position (shown in FIG. 14).

FIG. 18 is an exploded perspective view of a portion of the assembly shown in FIG. 17.

FIG. 19 is a side cross-sectional view of a pitting rubber of the assembly shown in FIG. 17.

DETAILED DESCRIPTION OF THE PREFERRED EMBODIMENTS

Figure 1:
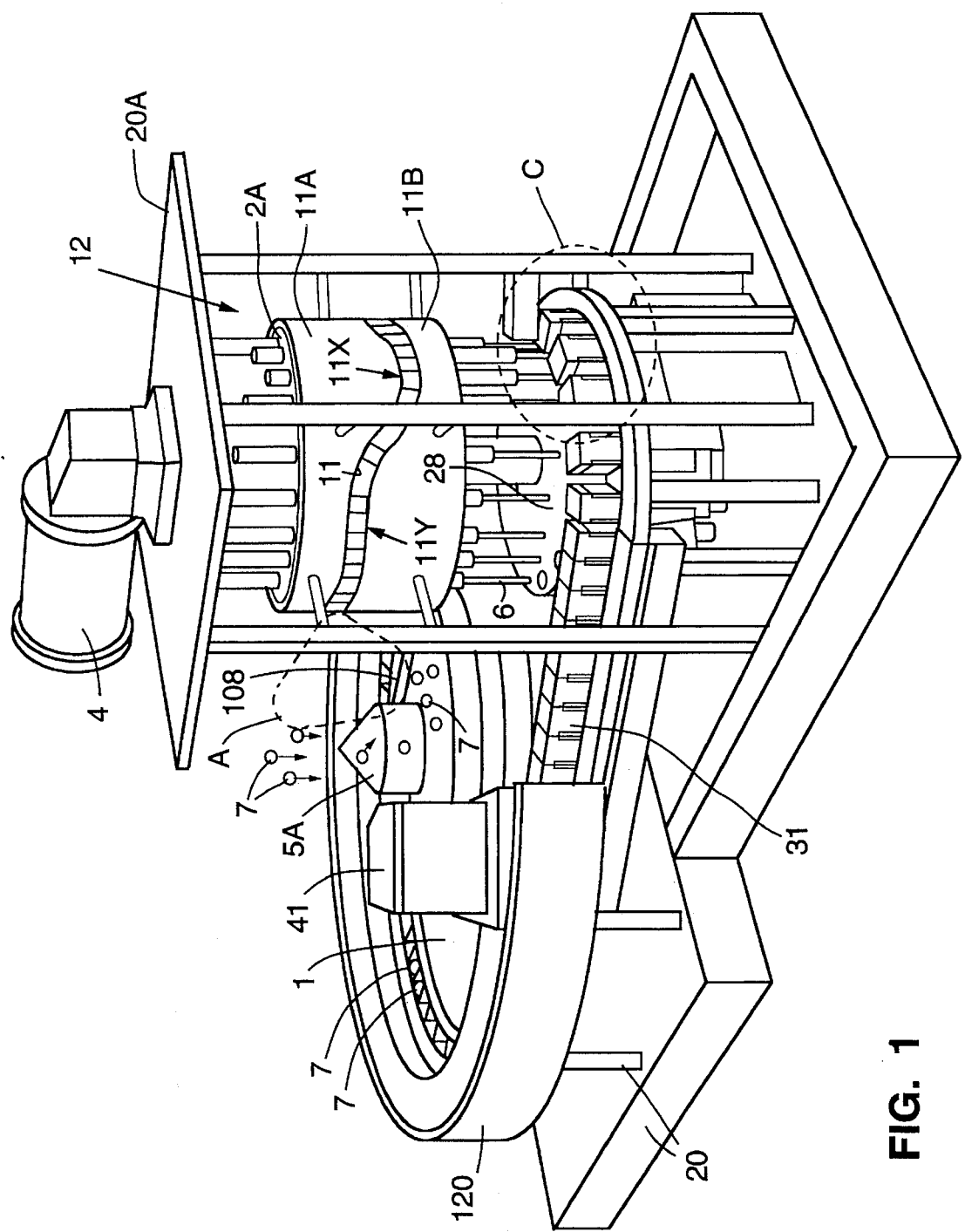
FIG. 1 is a perspective view of a preferred embodiment of the invention.

The processing stations of a preferred embodiment of the inventive apparatus will be described with reference to FIGS. 1 and 3. This embodiment is an apparatus for pitting prunes, dates, or other soft articles (typically, remoisturized, dried fruits each having a sticky outer surface), in which chain-driven chuck assemblies translate the articles between stations along a process path. During the description of the preferred embodiment, the articles to be pitted will be denoted as prunes, since it is contemplated that they will typically be remoisturized prunes or dates. However, use of this term is not intended to imply that the preferred embodiment is capable of pitting only prunes, or that the claimed invention is limited to an apparatus capable of pitting only prunes.

The preferred embodiment includes rotatable feed disk 1, rotatable pitting turret 12, frame 20 (which supports disk 1 and turret 12), chain 9 which extends around feed disk 1 and turret 12. Turret 12 is free to rotate about its vertically oriented central shaft 2, and disk 1 is free to rotate about its vertically oriented hub 5. Motor 4 (coupled to shaft 2) is provided for rotating shaft 2, thereby rotating pitting turret 12 about the central longitudinal axis of shaft 2.

A number of chuck assemblies (e.g., seventy or eighty) are attached to chain 9, with each chuck assembly having a fixed portion (30 or 30') fixedly attached to chain 9 and a sliding portion (31) slidably mounted to the fixed portion. Pitting rubber holder 28 (including pitting rubber mounts 8, blocks 15A, and pins 15, better shown in FIGS. 4, 17, and 18) rotates as a unit with (and is hingedly mounted to) shaft 2, and supports a relatively small number of pitting rubbers 16 (e.g., eighteen pitting rubbers). Pitting turret 12 also includes one pitting knife 6 for each pitting rubber 16. Each pitting rubber 16 supports one prune while one of the pitting knives 6 engages the prune to eject the prune's pit.

Sprocket 13 of turret 12 has teeth 13A around its outer peripheral surface, feed disk 1 has teeth 3 around its outer peripheral surface, and chain 9 extends around sprocket 13 and disk 1. As motor 4 and shaft 2 drive turret 12 (including sprocket 13) so that turret 12 rotates (counter-clockwise, as shown in FIG. 3), teeth 13A cause chain 9 to translate, thereby translating each chuck assembly attached to chain 9 along a closed path around feed disk 1 and turret 12 (and causing disk 1 to rotate about hub 5). Each chuck assembly includes a roller 32.

Figure 16:
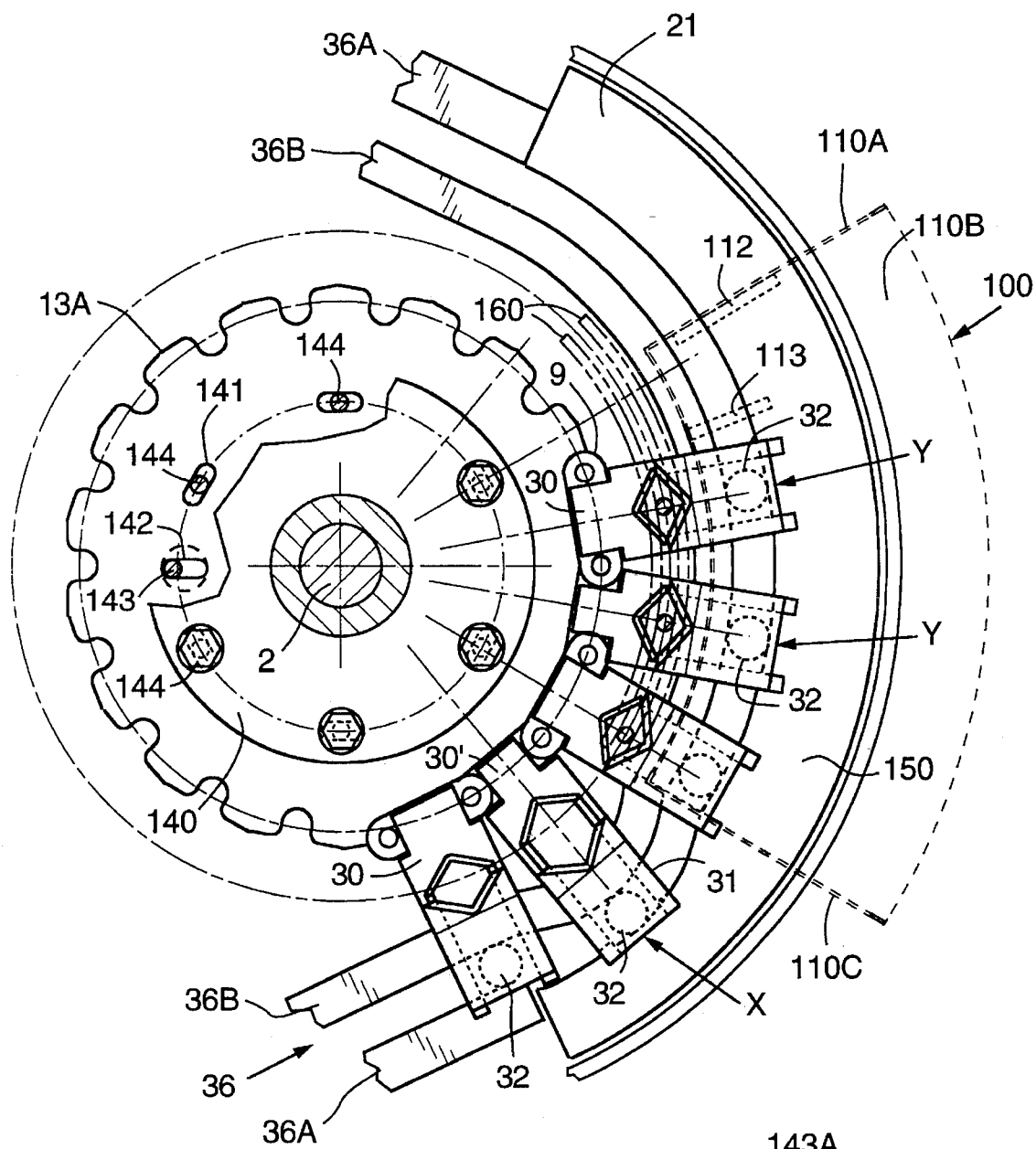
FIG. 16 is a top elevational view of a portion of the pitting turret of FIG. 15, in plane 16' (identified in FIG. 15).

Cam member 21 is mounted around a portion of turret 12 (in the plane of rollers 32), as shown in FIG. 16. Cam members 36A, 36B, 37, 38, 37', and 38' are mounted around a portion of disk 1 (in the plane of rollers 32). Cam members 36A and 36B extend into the space between disk 1 and turret 12 (also in the plane of rollers 32). Cam member 36B also extends around turret 12 in the plane of rollers 32 (as shown in FIG. 16). The space between cam members 36A and 36B, between cam members 21 and 36B, between cam members 37' and 38', and between cam members 37 and 38, is a cam track (36) which guides rollers 32 of the chuck assemblies around the above-mentioned closed path.

As motor 4 rotates shaft 2 and turret 12, each pitting rubber 16 translates along a generally circular path (below the plane of chain 9) around turret 12's central axis, and a knife (6) corresponding to each pitting rubber translates along a generally circular path (above the plane of chain 9) around turret 12's central axis.

Figure 3:
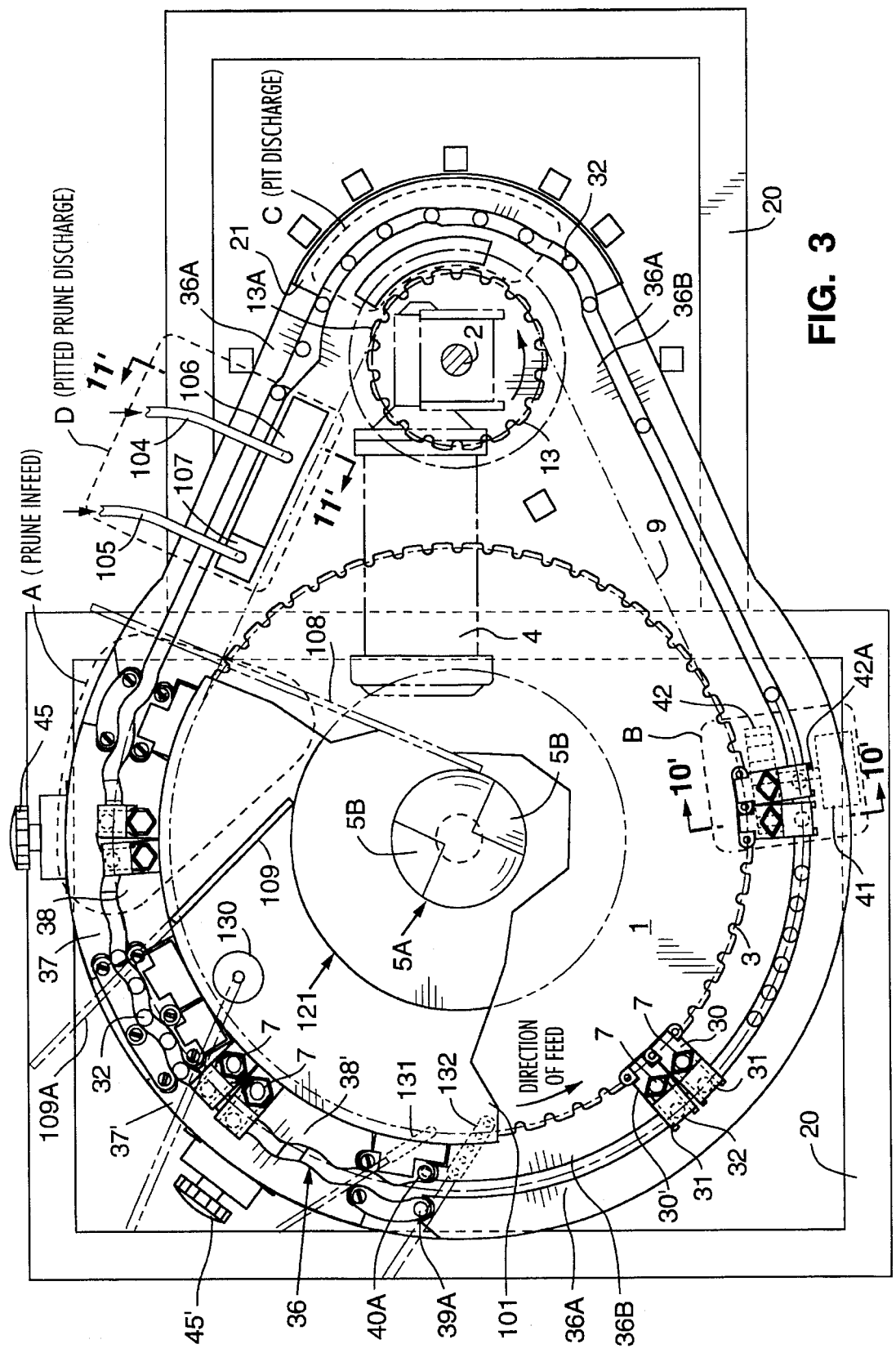
FIG. 3 is a simplified view (in a horizontal plane) of a portion of the FIG. 1 apparatus. The view is partially cross-sectional and partially elevational.
Figure 4:
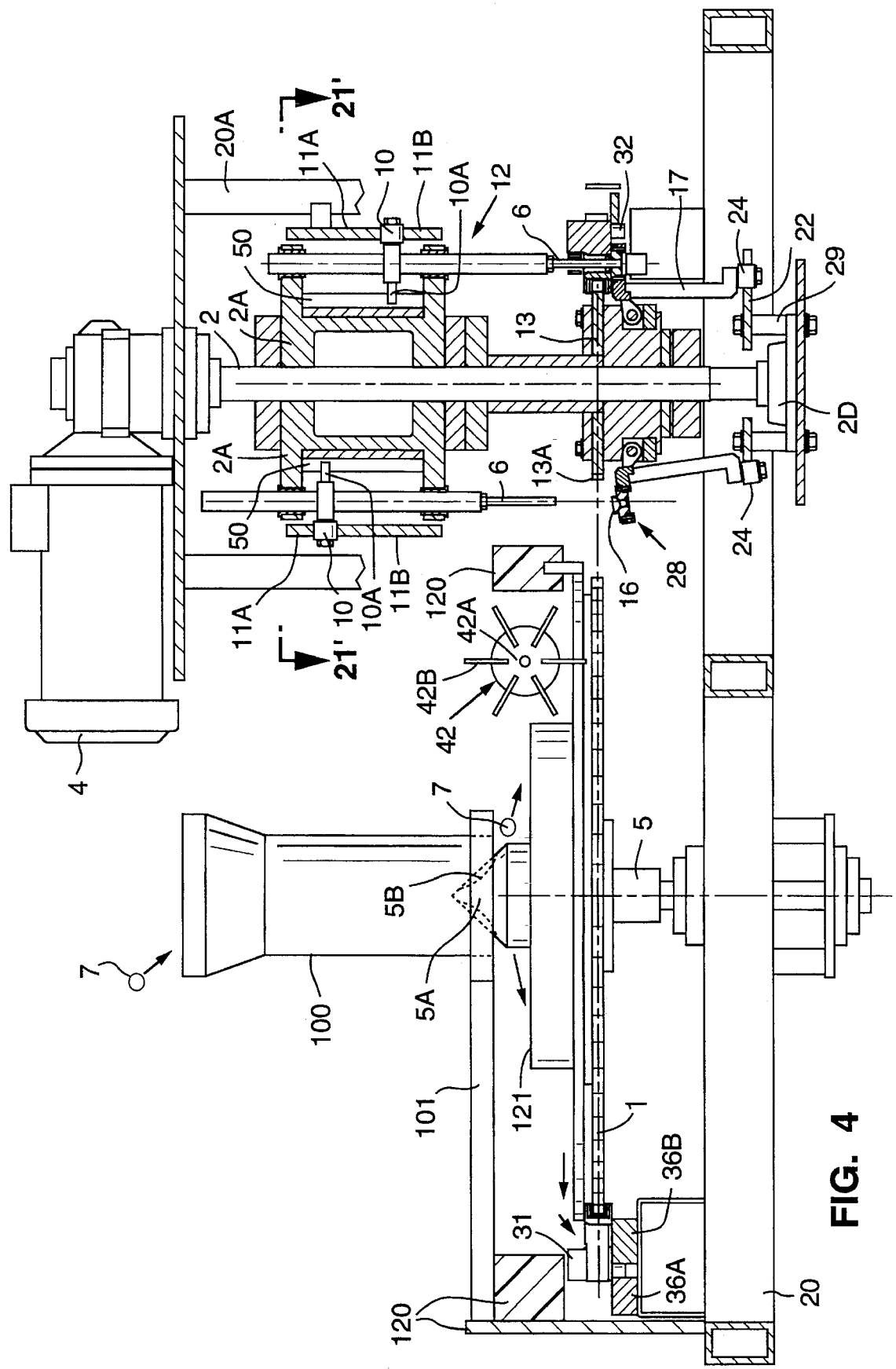
FIG. 4 is a side cross-sectional view (in a vertical plane) of the FIG. 1 apparatus.

We next describe the portion of the preferred embodiment which loads prunes between the jaws of each chuck assembly, with reference to FIGS. 1, 3, and 4. Platform 121 is fixedly mounted on disk 1, and generally conical hub member 5A is fixedly mounted on platform 121. Elements 1, 121, and 5A are coaxial with hub 5, and thus when chain 9 rotates disk 1, elements 1, 121, 5A, and 5 rotate together as a unit about the central (vertical) axis of hub 5.

Optionally, feed chute 100 is fixedly (but adjustably) mounted to frame 20 above member 5A. Prunes 7 are loaded onto the apparatus (e.g., by being dropped from a feed conveyor positioned above chute 100 and member 5A). When chute 100 is provided, prunes fall through chute 100 and out through the generally annular space between member 5A and the lower end of chute 100. Preferably, the position of chute 100 can be adjusted to control the size of this generally annular space, and thus to control the rate at which prunes fall onto member 5A and platform 121. Member 5A functions to divert prunes that fall onto it radially outward (toward the outer periphery of disk 1) onto platform 121. The prunes then fall from platform 121 onto disk 1, and a stream of the prunes then moves onto the chuck assemblies (preferably at a substantially uniform loading rate) as the chuck assemblies pass through prune infeed station A (shown in FIG. 1 and better shown in FIG. 3). In alternative embodiments, chute 100 is omitted, and prunes are simply dropped onto member 5A so as to fall onto platform 121 and then onto disk 1. Preferably, a water mist is sprayed onto station A to improve the handling characteristics of the prunes being loaded onto the chuck assemblies. In embodiments in which a nozzle 105 (to be described below) is provided at station D for directing a water jet on chuck assemblies passing through station D, a branch line can be connected to the water line which feeds nozzle 105, and the mist for station A can be emitted from a mist nozzle connected to the end of this branch line.

Hub member 5A preferably has a truncated cone shape, with a conical top and flat side faces 5B as shown. Horizontal blade 108 (preferably made of metal) is fixedly attached to frame 20 so as to extend between member 5A and frame in a plane just above the plane of platform 121. Thus, blade 108 wipes the surface of platform 121 (as chain 9 rotates disk 1 and platform 121 together as a unit), in order to direct prunes on platform 121 radially outward so as to fall onto disk 1 at station A. Wiper blade 109 (fixedly mounted to frame 20 by rod 109A as shown, and preferably made of rubber) is positioned just above the surface of disk 1, so as to wipe the surface of disk 1 (as chain 9 rotates disk 1 and platform 121 together as a unit), in order to direct prunes on disk 1 at station A radially outward onto the chuck assemblies being translated by chain 9.

Preferably, prune distributing elements such as elements 130, 131, and 132 are positioned along track 36 to even out the distribution of prunes on the chuck assemblies (to promote seating of one and only one prune between the jaws of each chuck assembly, and to divert extraneous prunes back onto disk 1 for translation back to infeed station A). Element 130 is a passively rotatable wheel (whose center is mounted to frame 20 by a rod as shown). Wheel 130 rotates passively (in a horizontal plane) in response to being struck by prunes riding past it at the boundary between disk 1 and the chuck assemblies, thereby redistributing these prunes. Blade 131 (preferably made of plastic) is fixedly mounted to frame 20 (by a rod as shown) in a position above the path of the chuck assemblies, and tube assembly 132 (comprising vertically oriented lengths of rubber tubing attached to a frame, which frame is fixedly mounted to frame 20 by a rod as shown) is also positioned above the path of the chuck assemblies. Blade 131 and the rubber tubes of assembly 132 function to clear extraneous prunes (prunes which are not seated between the jaws of the chuck assemblies) away from the chuck assemblies that pass below them, and to promote the seating of a single prune between the jaws of each chuck assembly.

As chain 9 and the chuck assemblies translate around the central vertical axis of hub 5 (and disk 1 rotates counter-clockwise about this axis as shown in FIG. 3), some of the prunes fall between (or on top of) the jaws of the chuck assemblies and are carried by the chuck assemblies to excess prune removal station B.

Outer wall 120 (fixedly attached to frame 20) extends around part of disk 1's outer periphery. Optionally also, cover 101 (shown in FIG. 4 and partially shown in FIG. 3) is mounted to wall 120 over station A and members 37, 38, 37', and 38'. The function of wall 120 (preferably made of hard plastic) and cover 101 (preferably made of metal) is to confine the prunes within the feed disk unit of the inventive apparatus. Wall 120 overhangs the upper surface of sliding jaw 31 of each chuck assembly (at least part of the way around disk 1). Thus, wall 120 will push (toward hub 5) any prunes that ride on jaws 31, thereby preventing the prunes from falling off the feed disk unit. If installed, cover 101 preferably covers those chuck assemblies whose jaws periodically open and close as pins 32 of the chuck assemblies translate between members 37 and 38 (and members 37' and 38') thus preventing prunes from escaping from the feed disk unit.

Figure 10:
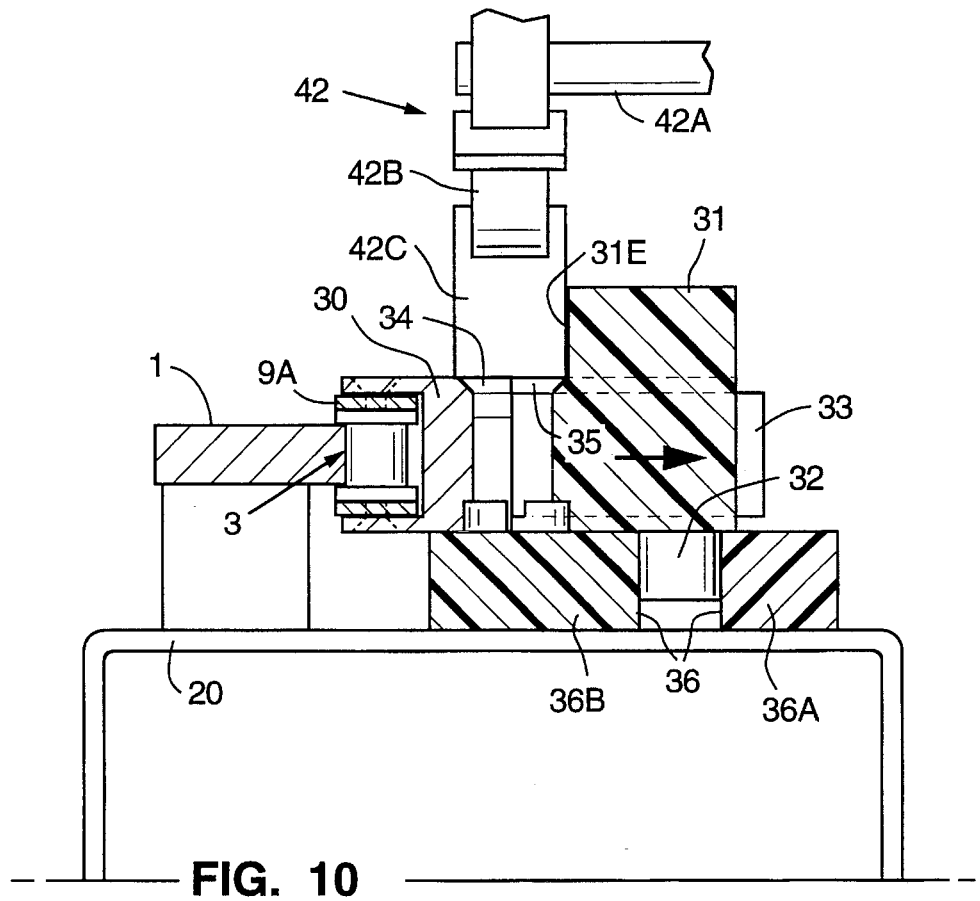
FIG. 10 is a simplified cross-sectional view of a portion of the FIG. 3 apparatus, in the plane determined by line 10'—10' of FIG. 3, showing the FIG. 7 assembly (on frame 20) in a fully closed position in which arms 33 of fixed jaw 30 extend as far as possible into grooves in the sides of sliding jaw 31, with extraneous product ejection wheel 42 above the chuck assembly.

At excess prune removal station B, rotating paddle wheel 42 (driven by motor 41 shown in FIG. 1) sweeps any non-seated prunes (prunes that are not properly seated between chuck jaws of the chuck assemblies) away from the chuck assemblies, before the chuck assemblies proceed toward the pitting turret. Thus, each chuck assembly that translates away from station B toward pitting turret 12 is either empty (i.e., carries no prune), or carries one properly seated prune between its chucks. Wheel 42 is rotatably mounted to motor 41 by shaft 42A (as best shown in FIGS. 3 and 10). Motor 41 drives wheel 42 by rotating shaft 42A. Preferably, wall 120 extends around station B, and optionally a cover (not shown) that is similar to (but smaller than) cover 101 is mounted over station B, to prevent prunes from escaping from the feed disk unit at station B.

The preferred chuck assembly structure will be described below with reference to FIGS. 2 and 5–11. For convenience, each chuck assembly will sometimes be denoted herein as a "prune carrier" or simply as a "carrier."

From station B, each carrier (and the prune, if any, carried thereby) translates to pitting turret 12, where the carrier meets a pitting rubber 16 in the sense that the rubber 16 moves into a position below the carrier. The carrier and the rubber 16 then translate together as a unit along a generally circular path (around shaft 2) to pit discharge station C. At station C, one of the pitting knives 6 engages the prune (if any) in the carrier, forces the prune down against rubber 16, and ejects the prune's pit (by pushing the pit out from within the prune and then through a hole in rubber 16).

After the pitting operation at station C, the carrier translates the pitted prune to pitted prune discharge station D. At station D, an air or water jet of the type to be described below (or a knockout wheel 26 of the type shown in FIGS. 24 and 25) pushes the pitted prune downward out from between the jaws of the carrier into a product discharge chute (chute 106 of FIG. 11) below frame 20.

In one preferred embodiment, motor 4 causes shaft 2 to rotate at a rate such that 1000 to 1200 carriers per minute pass through pit discharge station C.

In alternative embodiments, the chuck assemblies of the inventive apparatus are attached along (and driven along a process path) by a belt or looped member other than a chain consisting of links. For convenience, the term "chain" is used herein in a broad sense denoting all looped members, including belts (e.g., belts made of a continuous loop of material) as well as chains (e.g., the preferred chain described herein which comprises links 9A and 9B shown in FIG. 6).

Next, various features of the preferred embodiment will be described in detail with reference to FIGS. 1–23.

Among the important aspects of the invention are the following: each prune (or date or other article) being processed is carried from infeed station A to discharge station D between the chuck jaws of a single chuck apparatus; a movably mounted pitting rubber 16 meets the chuck apparatus at (or just before) pit discharge station C, so that the pitting rubber is available to support the prune when the pitting knife engages the prune; and all pitting rubbers 16 are mounted so as to be easily accessible (i.e., for removal and replacement) when each has been moved away from the chuck apparatus. Even in preferred implementations in which the apparatus includes a large number of chuck assemblies (e.g., seventy or eighty), it can include a substantially smaller number of pitting rubbers (e.g., eighteen pitting rubbers) each of which is mounted for quick and convenient removal and replacement (e.g., due to damage or wear).

Figure 5:
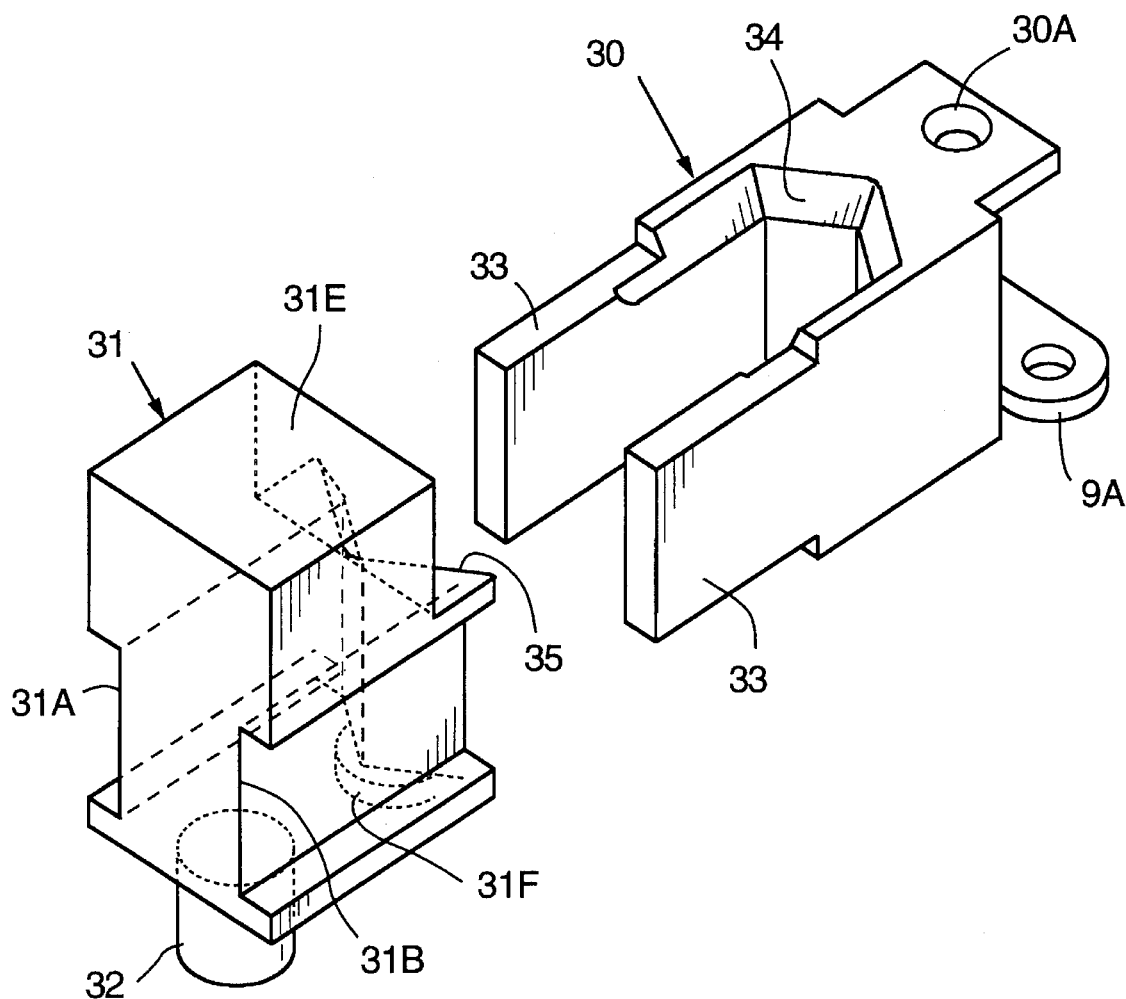
FIG. 5 is an exploded perspective view of one chuck assembly of the FIG. 1 apparatus, including a fixed chuck jaw and a sliding chuck jaw.
Figure 6:
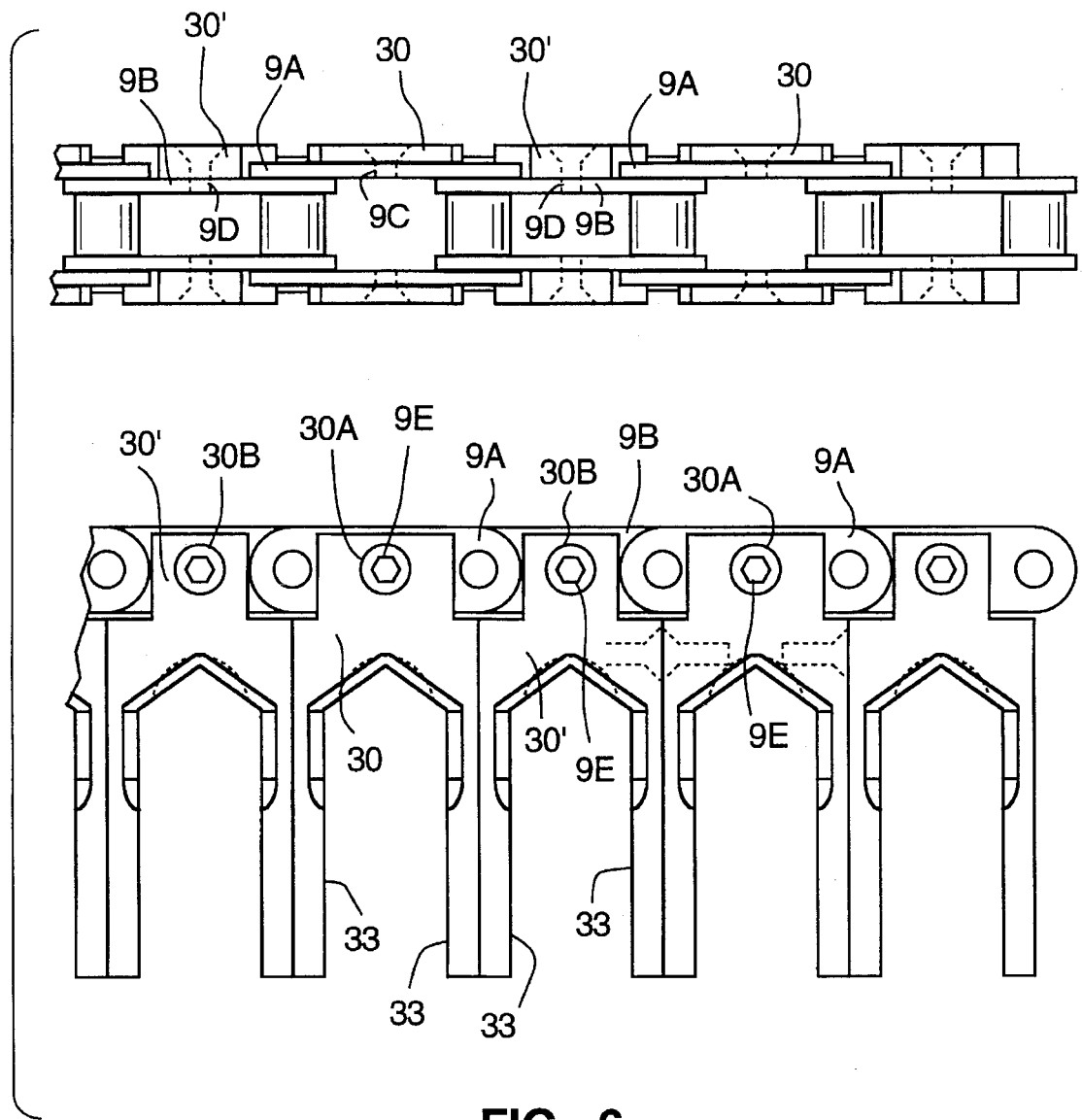
FIG. 6 is a top elevational view, and a side elevational view, of a portion of the chain of the FIG. 1 apparatus, with fixed chuck jaws attached thereto.

The preferred chuck assembly structure will next be described with reference to FIGS. 2 and 5–11. FIG. 5 is an exploded perspective view of one of the preferred chuck assemblies, including fixed chuck jaw 30 (sometimes denoted as a fixed "jaw") and sliding chuck jaw 31 (sometimes denoted as a sliding "jaw"). As shown in FIG. 6, chain 9 is made of links 9A and 9B, with one link 9B connecting each pair of links 9A. Each fixed jaw 30 is designed to be fixedly mounted to one link 9A of chain 9. Each of the slightly differently shaped fixed jaws 30' (shown in FIG. 6), is designed to be fixedly mounted to one link 9B of chain 9. One of sliding jaws 31 is slidably mounted to each of jaws 30 and 30' (in a manner to be explained below).

Jaw 30 has a central portion with V-shaped faces 34, two parallel arms 33 which extend out from the sides of the central portion, and a hole 30A through the central portion to be aligned with a corresponding hole 9C (shown in FIG. 6) through link 9A, so that a rivet 9E can be inserted through aligned holes 30A and 9C for mounting the central portion to link 9A. Jaw 30' is identical to jaw 30, except in that its central portion has a narrower end opposite faces 34 (as shown in FIG. 6), and in that a hole 30B extends through its central portion for alignment with a corresponding hole 9D through link 9B (so that a rivet 9E can be inserted through aligned holes 30B and 9D for mounting the central portion to link 9B). The central portion of each jaw 30' has a narrower end than does jaw 30 so that the end of jaw 30' can fit between two adjacent links 9A (as shown in FIG. 6) when jaw 30' is mounted to link 9B and a jaw 30 is mounted to each link 9A.

Sliding jaw 31 has grooves 31A and 31B in its side walls for receiving arms 33 of jaw 30 (or 30'). Sliding jaw 31 also has a central portion with V-shaped faces 35, and a roller 32 which extends downward from the bottom face of the central portion. Roller 32 preferably includes a pin fixedly attached to jaw 31's central portion and a roller portion around the pin, with the roller portion having freedom to rotate relative to the pin. The inner portion of sliding jaw 31 (the portion which faces fixed jaw 30 or 30') preferably extends above the upper edges of faces 34 and 35, thus defining a face 31E of jaw 31 (shown in FIG. 5 and also in FIGS. 10 and 11) whose function is to guide a prune into (and retain the prune in) the "central space" surrounded by faces 34 and 35 and arms 33 of each assembled chuck assembly. Jaw 31 also has a recessed surface 31F (preferably formed by counterboring the bottom portion of face 35). Surface 31F is dimensioned to receive part of a neck portion of a pitting rubber (neck portion 16B of pitting rubber 16 to be described below), to avoid deformation of the pitting rubber during the pitting operation. Each of fixed jaws 30 and 30' similarly has a recessed surface 30F (shown in FIG. 2 but not visible in FIG. 5), preferably formed by counterboring the bottom portion of face 34 of jaw 30 or 30'. Recessed surface 30F functions to receive part of the pitting rubber neck whose opposite portion fits against surface 31F of the sliding jaw 31 opposite the fixed jaw (in an assembled chuck assembly).

Preferably, each sliding jaw 31 is composed of hard plastic (such as Delrin material) except that each roller 32 is preferably made of metal. Also preferably, each fixed jaw 30 (and 30') is composed of metal (such as brass).

Figure 11:
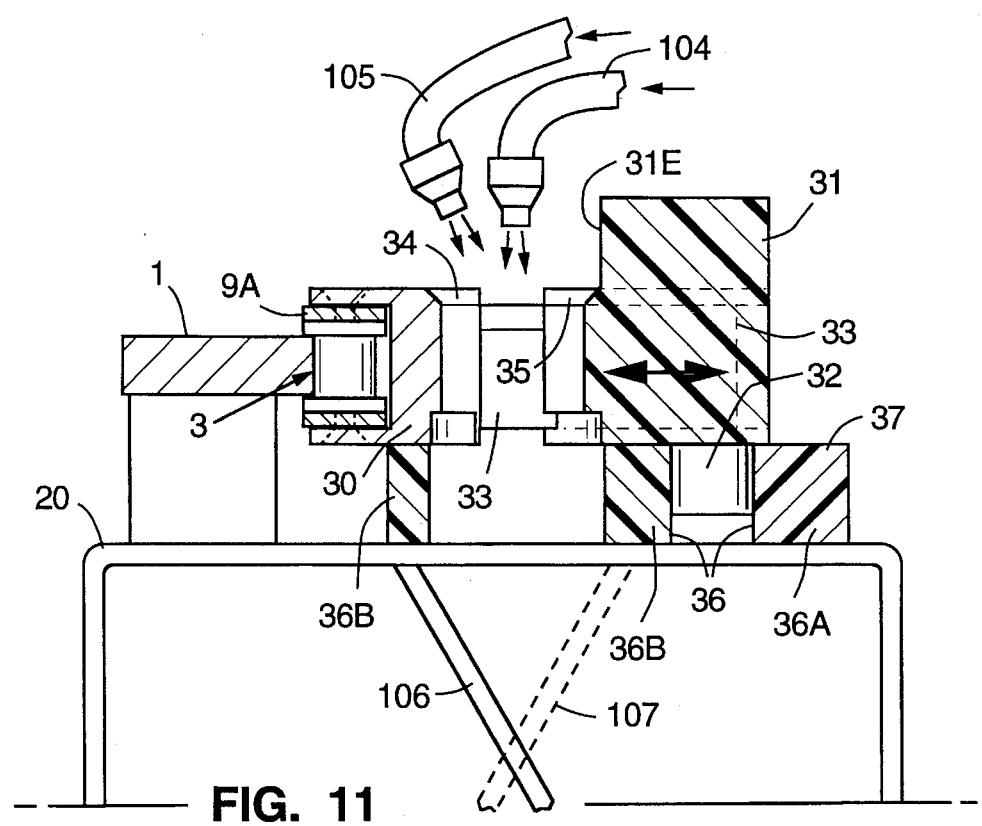
FIG. 11 is a simplified cross-sectional view of a portion of the FIG. 3 apparatus, in the plane determined by line 11'—11' of FIG. 3, showing the FIG. 7 assembly (on frame 20 at a position over product discharge chute 106) in an open position in which arms 33 of fixed chuck jaw 30 extend only partially into grooves in the sides of sliding chuck jaw 31 so that a pitted prune can be ejected from between jaws 30 and 31 so as to fall into chute 106.

To assemble a chuck assembly, the end of a fixed jaw's central portion is attached to link of chain 9 by a rivet (e.g., jaw 30 is attached to link 9A by rivet 9E, as shown in FIGS. 6, 7, and 8). Then, grooves 31A and 31B of a sliding jaw 31 are aligned with arms 33 of the fixed jaw (as shown in FIG. 8). Then, grooves 31A and 31B are slid onto arms 33 (as shown in FIG. 7) and roller 32 of sliding jaw 31 is inserted in the cam track between cam members 36A and 36B (or 37 and 38). When the chuck assembly is so assembled (as shown in FIGS. 10 and 11), jaw 31 is free to slide along arms 33 relative to jaw 30 (or 30') in the directions of the double-headed arrow of FIG. 11.

The chuck assembly is designed to receive a prune in the space surrounded by faces 34 and 35 and arms 33 (i.e., space Z shown in FIG. 7), as prune 7 (shown in FIG. 2) is held in a chuck assembly. The inner portion of sliding jaw 31 (which faces fixed jaw 30) preferably extends above the upper edges of faces 34 and 35, thus defining a face 31E of jaw 31 (best shown in FIGS. 10 and 11) whose function is to guide a prune into (and retain the prune in) the "central space" surrounded by faces 34 and 35 and arms 33. Considered together, the faces 31E of the jaws 31 around feed disk 1 define a "live wall." At least a portion of the live wall oscillates radially (relative to hub 5 of disk 1 in a manner to be explained below) to promote the guiding of prunes into the central space of each chuck assembly.

Figure 2:
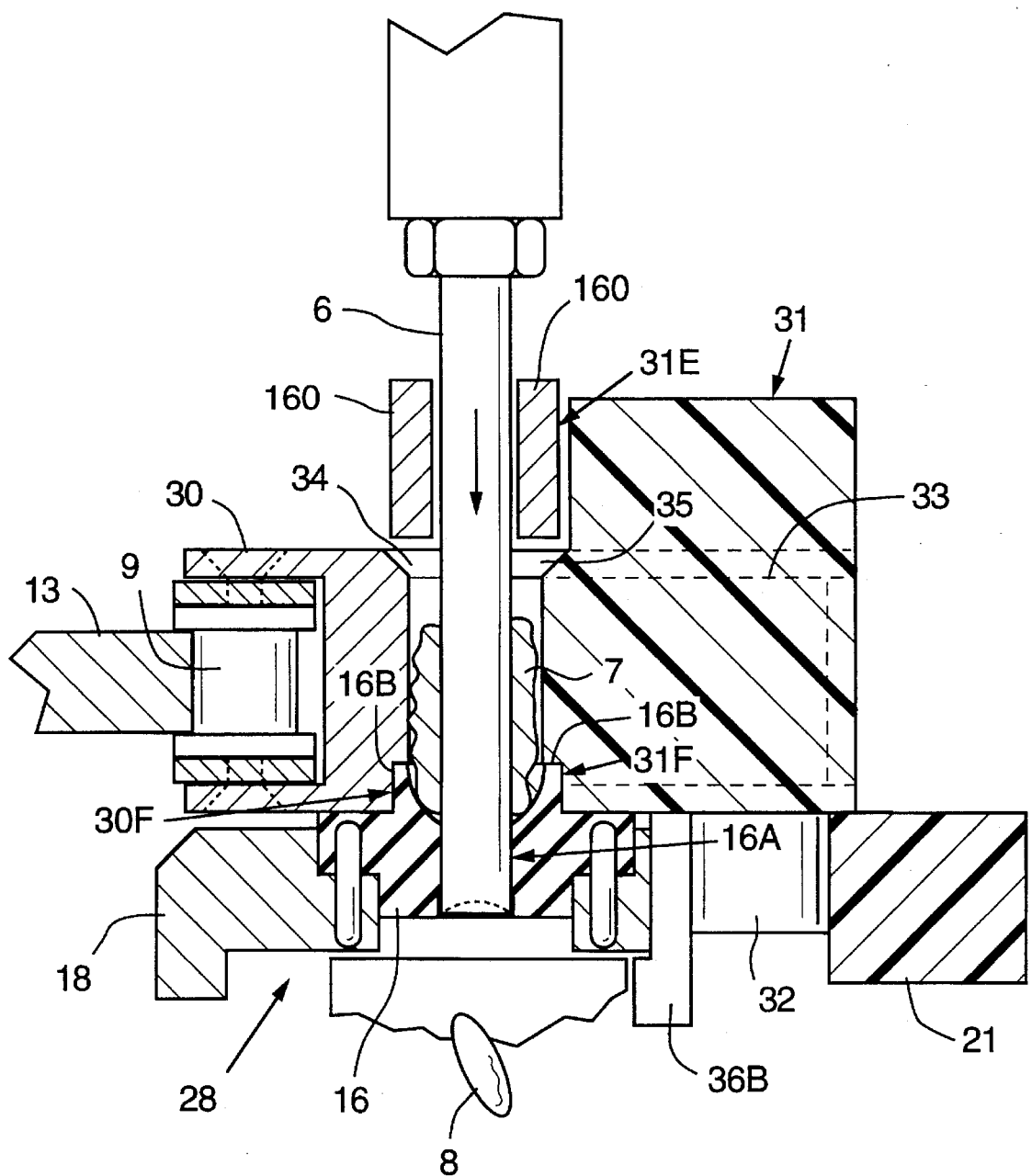
FIG. 2 is a side cross-sectional view of a portion of the FIG. 1 apparatus showing a pitting knife engaged with a prune, after the knife has pushed out a pit from within the prune.

FIG. 2 also shows a pitting rubber 16 positioned below the chuck assembly shown in FIG. 2. Pitting rubber 16 has a hole 16A therethrough for receiving the blade portion of knife 6, and a neck portion 16B surrounding the upper end of hole 16A. The tubular end portion of each knife 6 is denoted herein as a "blade portion" although typically the distal end of such end portion (having annular cross-section) is not sharpened. FIG. 2 shows the blade portion of one of pitting knives 6 engaged with prune 7 (at an instant just after the blade portion has pushed prune 7 down against rubber 16, and then pushed pit 8 out from within prune 7 and out through the lower end of hole 16A.

During pitting (when the blade portion of knife 6 is engaged with prune 7 as shown in FIG. 2), neck 16B of rubber 16 is sandwiched between prune 7 and jaws 30 and 31 to keep meat from the prune from squeezing through between pitting rubber 16 and the chuck assembly. Jaw 31 has a recessed surface 31F (formed by counterboring the bottom portion of face 35 of jaw 31) which receives a portion of neck 16B, and jaw 30 has a recessed surface 30F (formed by counterboring the bottom portion of face 34 of jaw 30) which receives the opposite portion of neck 16B. By including recessed surfaces 30F and 31F, the preferred embodiment avoids deforming neck 16B when neck 16B is sandwiched between prune 7 and jaws 30 and 31 (e.g., at times when prune 7 is engaged by one of pitting knives 6).

At the pitting station, each knife 6 translates between a pair of parallel knife clearing blades 160 (shown in FIGS. 2 and 16). As each knife rises vertically after pitting a prune, blades 160 function by clearing from each knife 6 any pit or prune material that clings to the knife.

As noted, the roller 32 of each chuck assembly rides in the cam track (36) between cam members 36A and 36B, between cam members 21 and 36B, between cam members 37 and 38, and between cam members 37' and 38', as chain 9 translates the chuck assembly around the above-mentioned closed path.

Cam track 36 extends perpendicularly to the plane of both FIG. 10 and FIG. 11, so that the chuck assembly shown in FIG. 10 (and FIG. 11) is free to translate perpendicularly into the plane of FIG. 10 (and FIG. 11) as chain 9 translates along sprocket 3 around the outer edge of disk 1. Cam members 36A and 36B (shown in FIGS. 10 and 11), cam member 21 (shown in FIG. 16), and cam members 37, 38, 37', and 38' (shown in FIG. 12) are preferably made of hard plastic (such as Delrin material).

FIG. 10 shows the chuck assembly (in the plane determined by line 10'—10' of FIG. 3) at a point at which the chuck assembly is closed (in the sense that faces 34 of jaw 30 abut faces 35 of jaw 31, and arms 33 of fixed jaw 30 extend as far as possible through jaw 31). As shown in FIG. 10, member 36B extends under faces 34 and 35, thus preventing any prune (or prune fragment) from falling through the chuck assembly to the area below frame 20. Rotating paddle wheel 42 (driven by motor 41 shown in FIG. 1 but not in FIG. 10) sweeps any prune that is not properly seated between jaws 30 and 31 away from the chuck assembly, before the chuck assembly proceeds toward the pitting turret. Wheel 42 consists of a central portion fixedly attached to shaft 42A. The central portion has a number of arms which extend out radially therefrom, and a short rubber tube 42C is fitted onto the end of each arm 42B. Flexible tubes 42C engage the non-seated prunes, and move them away without damaging them.

As the chuck assembly continues to move into the plane of FIG. 10 (after translating past wheel 42), its jaws undergo a cycle of opening and then closing, as roller 32 follows the radially varying cam track portion defined by the space between members 36A and 36B (and then between members 21 and 36B) around the pitting turret to the pitting station. The cam track portion defined by the space between members 36A and 36B and between members 21 and 36B is "radially varying" in the sense that its radial distance, from the center of shaft 2, varies with angular position around the periphery of the pitting turret.

FIG. 11 shows the chuck assembly at pitted prune discharge station D (in the plane determined by line 11'—11' of FIG. 3), at a point at which track 36 causes roller 32 of the chuck assembly to be separated from chain 9, so that the chuck assembly is open (in the sense that faces 34 of jaw 30 are separated from faces 35 of jaw 31, and arms 33 of fixed jaw 30 do not extend as far as possible into jaw 31). As shown in FIG. 11, there is a hole through member 36B under faces 34 and 35. The hole through member 36B provides access for a pitted prune (not shown in FIG. 11) carried by the chuck assembly to be ejected, by a jet of water (or pressurized air) escaping from nozzle 104 (or by knockout wheel 26 shown in FIGS. 24 and 35), downward and away from the chuck assembly, so that the ejected pitted prune will fall into product discharge chute 106 attached to frame 20. After a fluid jet from nozzle 104 ejects the pitted prune from the chuck assembly, the assembly continues to translate (into the plane of FIG. 11) past a second jet of water (or pressurized air) escaping from second nozzle 105. This second fluid jet cleans any remaining prune material (e.g., fragments of a prune) from the chuck assembly, and this material falls into waste chute 107.

As the chuck assembly continues to move into the plane of FIG. 11 (after translating past nozzle 105), it will encounter members 37 and 38 (to be described with reference to FIG. 12) and its jaws undergo a cycle of opening and then closing, as roller 32 follows the radially varying cam track portion defined by the space between members 37 and 38 (and then between members 37' and 38') around feed disk 1. The cam track portion defined by the space between members 37 and 38 (and between members 37' and 38') is "radially varying" in the sense that its radial distance, from the center of hub 5, varies with angular position around the periphery of disk 1.

Figure 12:
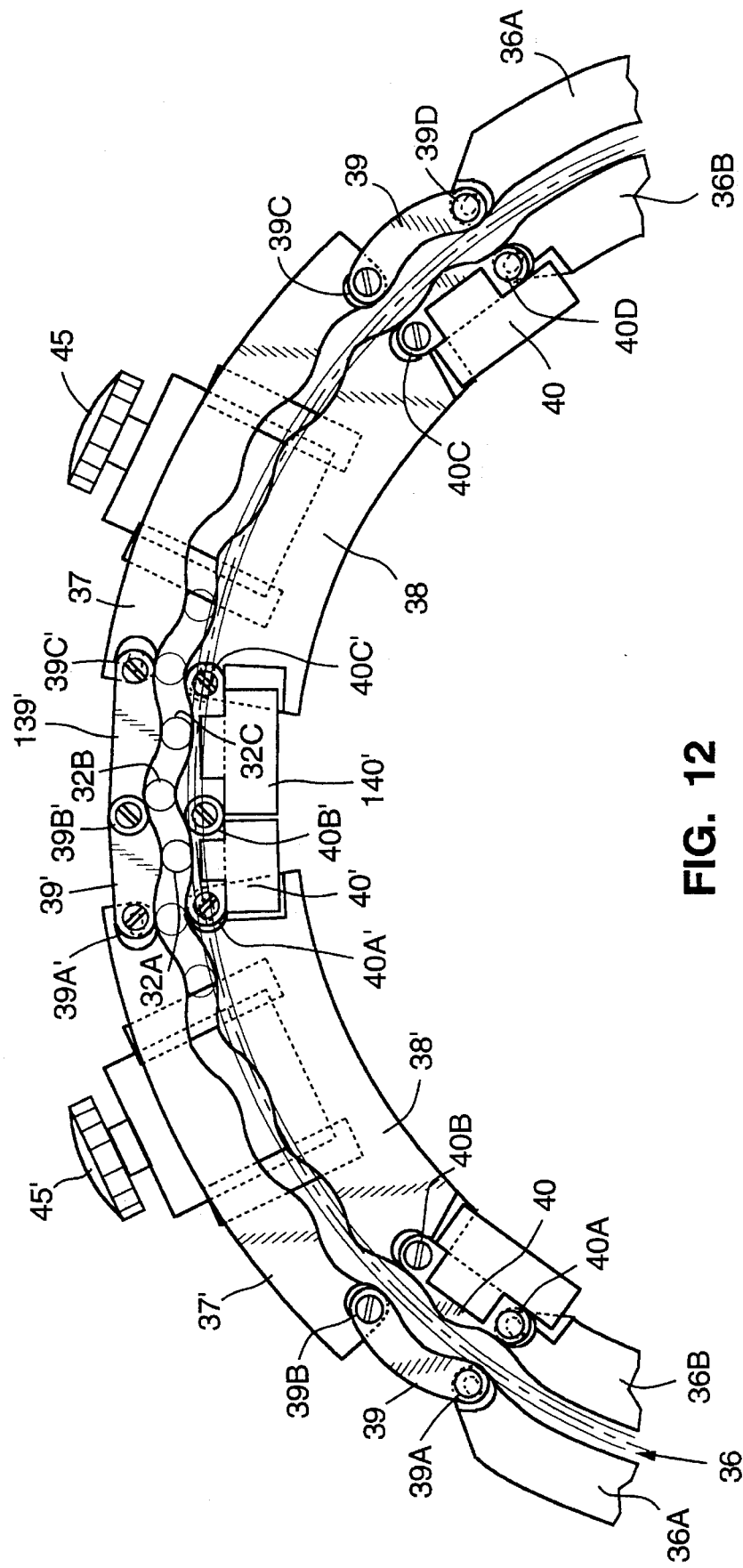
FIG. 12 is a top elevational view of an adjustable portion of the feed disk assembly of the FIG. 1 apparatus.
Figure 24:
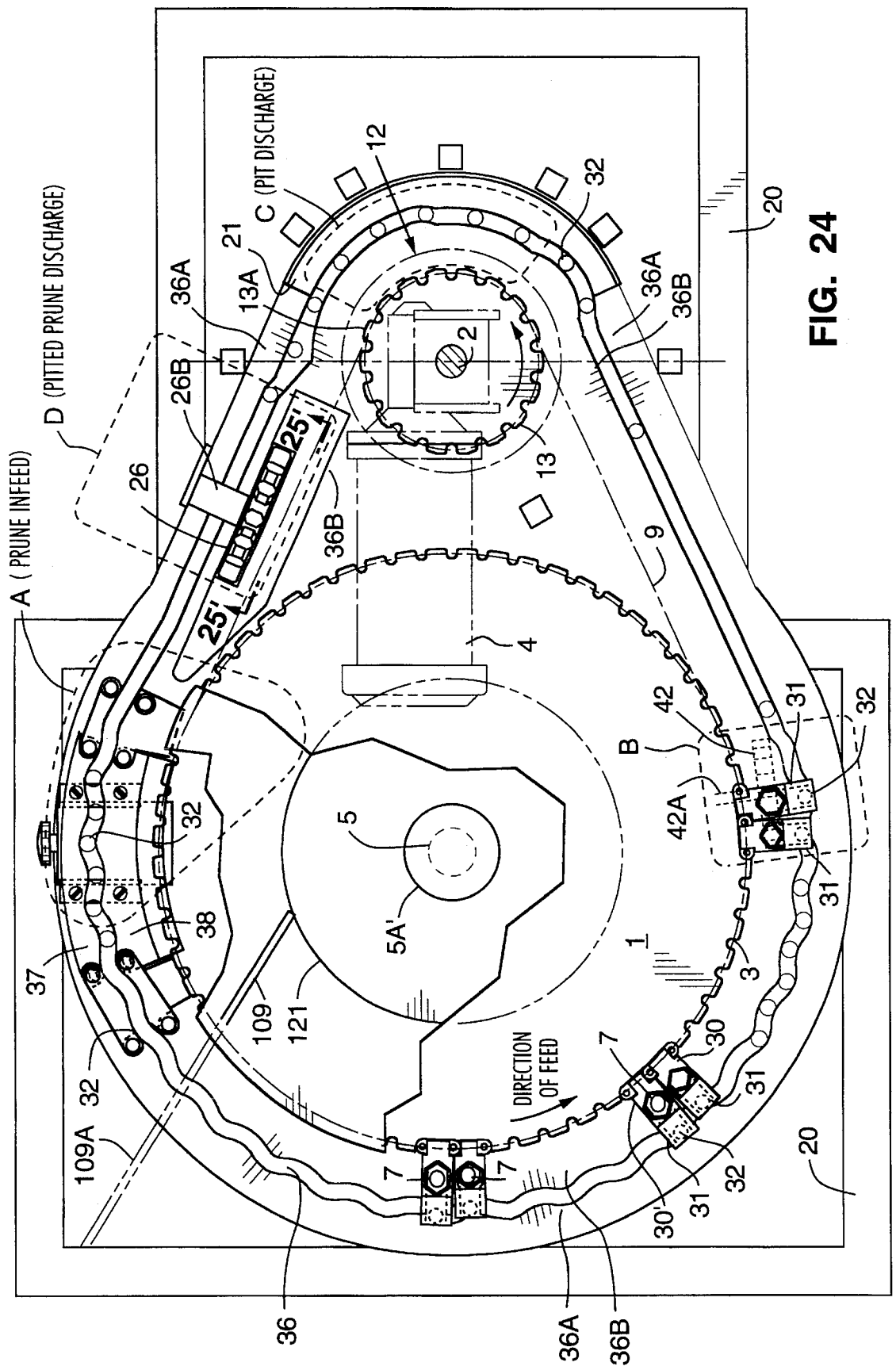
FIG. 24 is a partial, simplified cross-sectional view (in a horizontal plane) of an alternative embodiment of the inventive apparatus.

A portion of cam track 36 around feed disk 1 of the preferred embodiment is shown in FIG. 12. A corresponding portion of cam track 36 around feed disk 1 of the alternative embodiment of FIG. 24 is shown in FIGS. 13 and 14. The difference between the embodiment of FIG. 12 and that of FIGS. 13 and 14 is that the former embodiment has two independently controllable adjustable cam track pairs (37,38 and 37'38') and the latter embodiment has one adjustable cam track pair (37,38). It is usually better to employ a relatively long adjustable portion of cam track 36 (which can be achieved by using both pairs 37,38 and 37',38' having a relatively long combined length) than a relatively short adjustable portion of cam track 36 (e.g., by using only pair 37,38 as in the embodiment of FIGS. 13 and 14), to enable the feed disk unit to be adjusted adequately (for processing each batch of prunes, dates, or other fruits having a particular set of average characteristics) to cause one and only one prune (or other article) to be seated between the jaws of a high percentage of the chuck assemblies as they translate around feed disk 1.

With reference to FIG. 12, the portion of cam track 36 between member 37 and 38 (and between members 37' and 38') has a radius (relative to the center of hub 5) which varies sinusoidally. The purpose of this sinusoidal variation is to urge one prune to seat itself in a vertical orientation (with the longest axis of the prune oriented vertically) between the fixed and sliding jaw of each chuck assembly. As sliding jaw 31 of each chuck assembly rides along the sinusoidally varying portion of cam track 36, the chuck assembly periodically opens (into a configuration as shown in FIG. 11) and closes (into a configuration as shown in FIG. 10). This oscillating (periodically changing) configuration of each chuck assembly exerts forces on the prunes to urge them into vertical orientations in the chuck assemblies. Faces 31E of sliding jaws 31 of the chuck assemblies around feed disk 1 define a live wall (as noted above), and at least a portion of the live wall oscillates radially (relative to hub 5) to promote the guiding of prunes into the central space of each chuck assembly.

For convenience, we first describe the simpler embodiment of FIGS. 13 and 14, and then describe the slightly more complicated embodiment of FIG. 12.

With reference to FIG. 13, cam track 36 (along which a sliding jaw of each chuck assembly rides) has an adjustable cam track portion at prune infeed station A, which is defined by the assembly including members 37 and 38. This assembly can be adjusted (by manipulating adjustment screw 45) to vary the initial maximum spacing between the fixed and sliding jaw of each chuck assembly at the prune infeed station. As shown in FIGS. 13 and 14, cam member 37 (adjustably mounted to cam member 36A by pivoting members 39) and cam member 38 (adjustably mounted to cam member 36B by pivoting members 40) perform this function. To obtain a smaller average gap between the fixed and sliding jaw of each chuck assembly at the infeed station A (for processing relatively small prunes), members 39 are pivoted about pivots 39A, 39B, 39C, and 39D in the directions shown in FIG. 13, to move member 37 toward hub 5 (in the direction of arrow X of FIG. 13), and members 40 are pivoted about pivots 40A, 40B, 40C, and 40D in the directions shown in FIG. 13, to move member 38 toward hub 5 (in the direction of arrow X of FIG. 13). This reduces the risk that more than one prune will fall between the jaws of each chuck assembly at infeed station A.

To obtain a larger average gap between the fixed and sliding jaw of each chuck assembly at the infeed station A (for processing relatively large prunes), members 39 are pivoted about pivots 39A, 39B, 39C, and 39D in the directions shown in FIG. 14, to move member 37 away from hub 5 (in the direction of arrow Y of FIG. 14), and members 40 are pivoted about pivots 40A, 40B, 40C, and 40D in the directions shown in FIG. 14, to move member 38 away from hub 5 (in the direction of arrow Y of FIG. 14). This allows a larger prune to fall between the jaws of each chuck assembly.

FIG. 13A is a top elevational view of three chuck assemblies, whose rollers 32 have the positions 32A, 32B, and 32C (shown in FIG. 13), respectively, as they translate between members 37 and 38, with members 37 and 38 in the first position (shown in FIG. 13). The maximum gap between faces 34 and faces 35 is shown in FIG. 13A to be "S1", and the average gap between faces 34 and 35 of the three assemblies is relatively small.

FIG. 14A is a top elevational view of three chuck assemblies, whose rollers 32 have the positions 32D, 32E, and 32F, (shown in FIG. 14) respectively, as they translate between members 37 and 38, with members 37 and 38 in the second position (shown in FIG. 14). The maximum gap between faces 34 and faces 35 of these three assemblies is shown in FIG. 14A to be "S2" (which is substantially greater than S1 shown in FIG. 13A), and the average gap between faces 34 and 35 of the three assemblies is larger in FIG. 14A than in FIG. 13A. Thus, larger prunes can be seated between the jaws of the assemblies of FIG. 14A than between the jaws of the assemblies of FIG. 13A. Also, there is a greater risk that two small prunes can become lodged between the jaws of the assemblies of FIG. 14A than between the jaws of the assemblies of FIG. 13A.

By advancing adjustment screw 45 toward the bottom of FIG. 14, members 37 and 38 can be moved from the second position shown in FIG. 14 to the first position (shown in FIG. 13). By retracting adjustment screw 45 toward the top of FIG. 13, members 37 and 38 can be moved from the first position shown in FIG. 13 to the second position (shown in FIG. 14).

In alternative embodiments, the radius (relative to the center of hub 5) of the portion of cam track 36 which surrounds disk 1 varies periodically (in a manner other than sinusoidally).

The preferred embodiment of FIG. 12 includes all elements of the FIG. 13 embodiment, and also includes a second set of similar elements (including members 37', 38' and adjustment screw 45'). The second set of elements is adjustable independently from the first set (by manipulating adjustment screw 45') to vary the maximum spacing between the fixed and sliding jaw of each chuck assembly as the assembly translates along track 36 after passing between members 37 and 38. As shown in FIG. 12, cam member 37' is adjustably mounted to cam member 36A by pivoting member 39 and to pivoting member 139' by pivoting member 39', member 39' is rotatably attached to member 139' by pivot 39B', member 139' is rotatably attached to cam member 37 by pivot 39C', and cam member 37 is adjustably mounted to cam member 36A by another pivoting member 39. Similarly, cam member 38' is adjustably mounted to cam member 36B by pivoting member 40 and to pivoting member 140' by pivoting member 40', member 40' is rotatably attached to member 140' by pivot 40B', member 140' is rotatably attached to cam member 38 by pivot 40C', and cam member 38 is adjustably mounted to cam member 36B by another pivoting member 40.

To obtain a smaller average gap between the fixed and sliding jaw of each chuck assembly at the infeed station A (for processing relatively small prunes), screw 45 is advanced to push members 37 and 38 radially inward (thereby pivoting member 39 about pivots 39C and 39D, pivoting member 40 about pivots 40C and 40D, pivoting member 139' about pivots 39B' and 39C', and pivoting member 140' about pivots 40B' and 40C'). When members 37 and 38 are so moved to obtain a smaller average gap between the fixed and sliding jaw of each chuck assembly at the infeed station A, screw 45' is typically also advanced to push members 37' and 38' radially inward by a similar amount (thereby pivoting member 39' about pivots 39A' and 39B', pivoting member 39 on the left side of FIG. 12 about pivots 39A and 39B, pivoting member 40' about pivots 40A' and 40B', and pivoting member 40 about pivots 40A and 40B).

To obtain a larger average gap between the fixed and sliding jaw of each chuck assembly at the infeed station A (for processing relatively large prunes), screw 45 is retracted (toward the top of FIG. 12) to pull members 37 and 38 radially outward (thereby pivoting member 39 in the opposite direction about pivots 39C and 39D, pivoting member 40 in the opposite direction about pivots 40C and 40D, pivoting member 139' in the opposite direction about pivots 39B' and 39C', and pivoting member 140' in the opposite direction about pivots 40B' and 40C'). This allows a larger prune to fall between the jaws of each chuck assembly. When members 37 and 38 are so moved to obtain a larger average gap between the fixed and sliding jaw of each chuck assembly at the infeed station A, screw 45' is typically also retracted (toward the top of FIG. 12) to pull members 37' and 38' radially outward by a similar amount (thereby pivoting member 39' in the opposite direction about pivots 39A' and 39B', pivoting member 39 on the left side of FIG. 12 in the opposite direction about pivots 39A and 39B, pivoting member 40' in the opposite direction about pivots 40A' and 40B', and pivoting member 40 in the opposite direction about pivots 40A and 40B).

In the preferred embodiment of FIGS. 1–4 and 12, the remaining portion of track 36 around disk 1 is not sinusoidally varying, and instead has a relatively small radius causing each chuck assembly to translate along it in a closed position (as shown in FIG. 10) in which each chuck assembly grips any prune seated between its faces 34 and 35. Only when the chuck assembly reaches the pitting turret does track 36 cause its jaws to open (but at this point, they open only for a short time and then close again before the chuck assembly reaches pit discharge station C).

Figure 20:
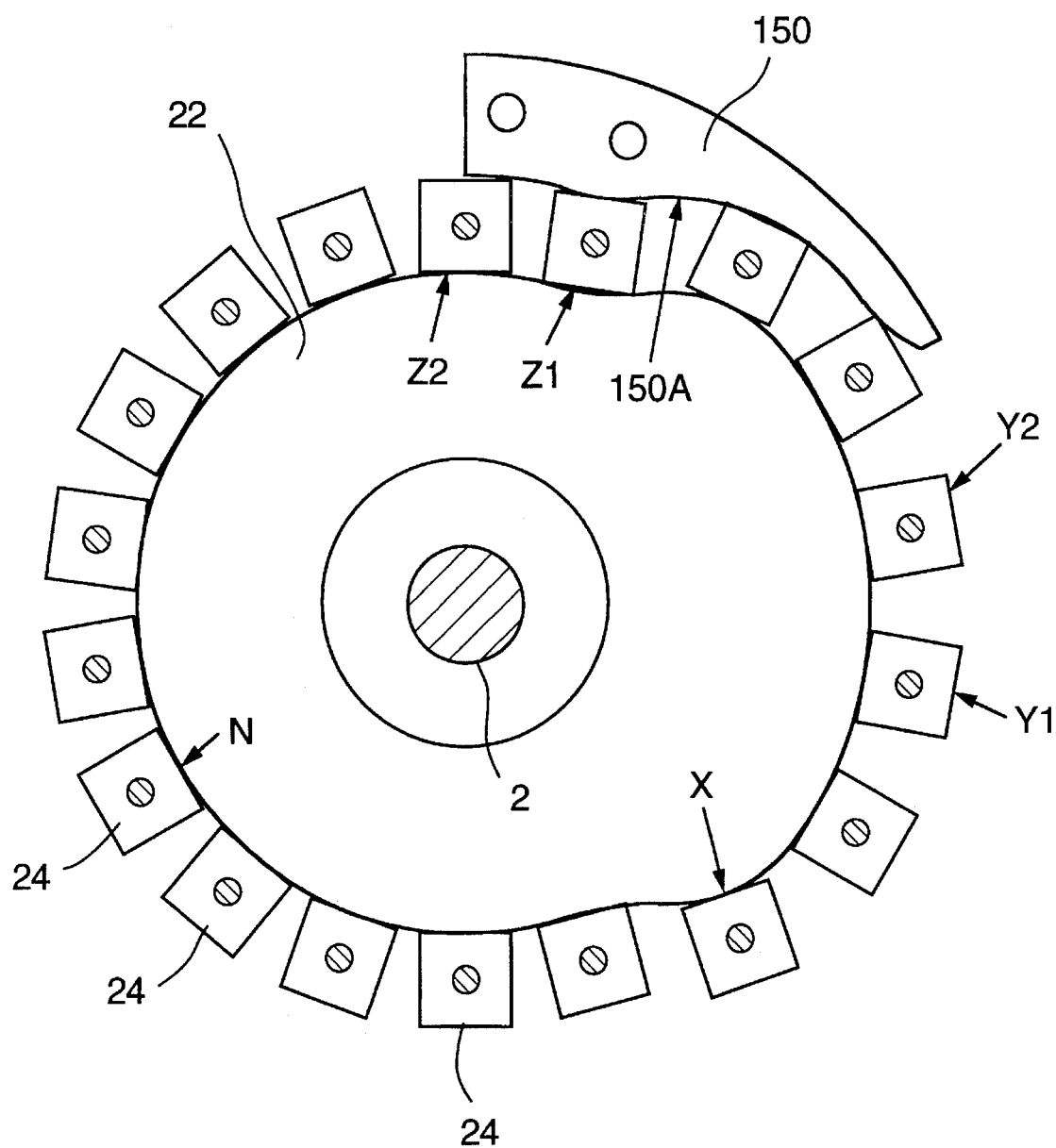
FIG. 20 is a cross-sectional view of a portion of the pitting turret of FIG. 15, in the plane determined by line 20'—20' of FIG. 15.
Figure 21:
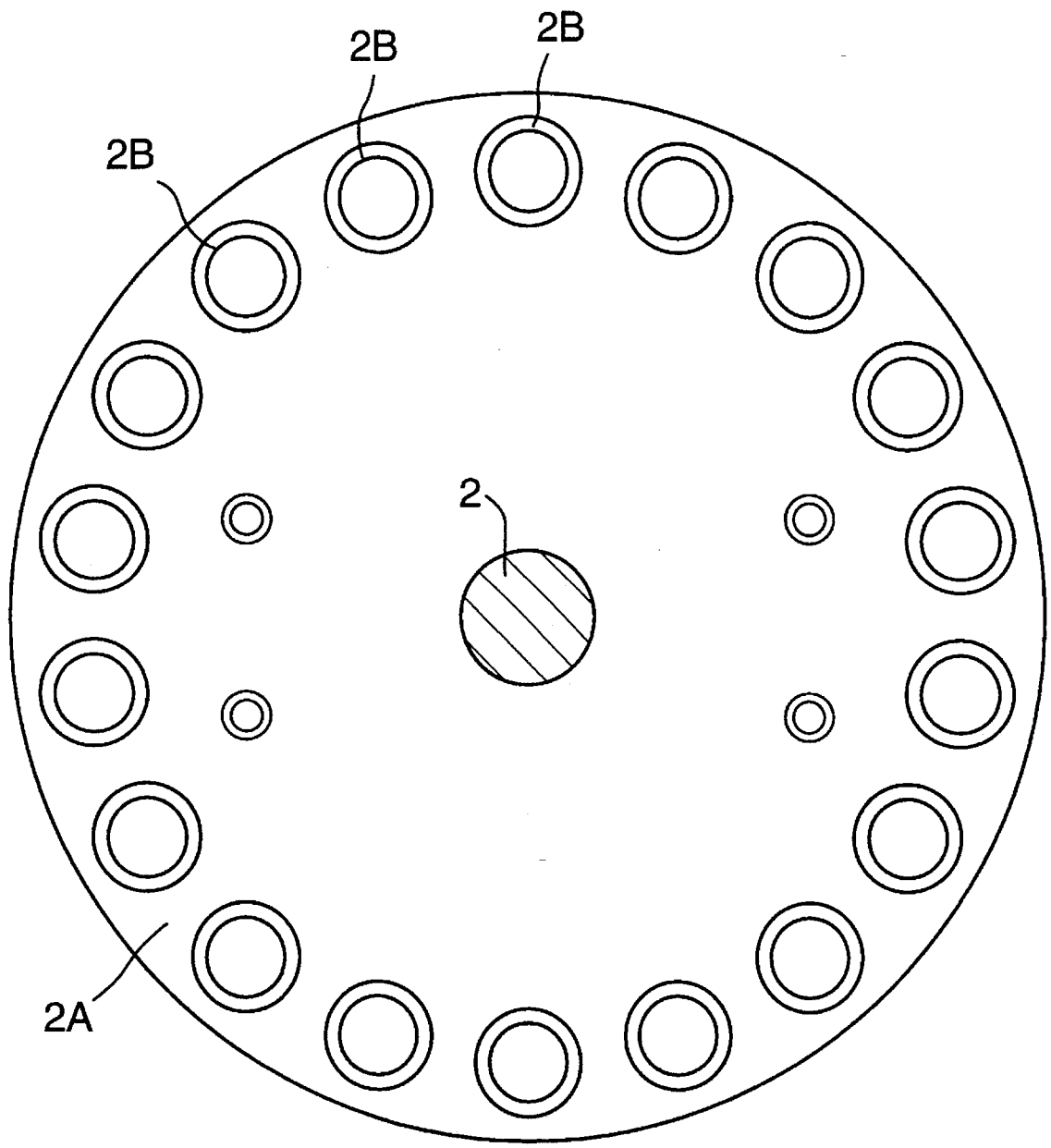
FIG. 21 is a cross-sectional view of mount 2A of the FIG. 4 apparatus, in the plane determined by line 21'—21' of FIG. 4.

We next describe the pitting turret of the inventive apparatus in greater detail, with reference to FIGS. 1, 2, 4, and 15–22. Pitting turret 12 includes mount member 2A (which is fixedly attached to shaft 2 (as shown in FIGS. 4 and 21), and eighteen identical pitting knives 6, each pitting knife mounted in a cylindrical, vertically oriented, channel 2B (shown in FIG. 21) through mount member 2A. As shown in FIG. 21, member 2A has eighteen channels 2B, each for receiving one of knives 6. Member 2A rotates as a unit with shaft 2 relative to frame 20 (including tower portion 20A of frame 20). A cam follower 10 (having an inner end 10A) rigidly attached to each knife 6 is slidably mounted to member 2A, with each inner end 10A extending into a vertically oriented channel 50 defined by member 2A. An outer end of each cam follower 10 rides in the gap (which is a cam track 11) between upper cam member 11A and lower cam member 11B. Cam members 11A and 11B, which are fixedly attached to tower portion 20A of frame 20, remain fixed while the assembly comprising shaft 2, member 2A, knives 6, cam followers 10, support member 14 (to be discussed below), and pitting rubber holder 28 and cam follower arms 17 (to be discussed below) rotates relative to frame 20.

Figure 22:
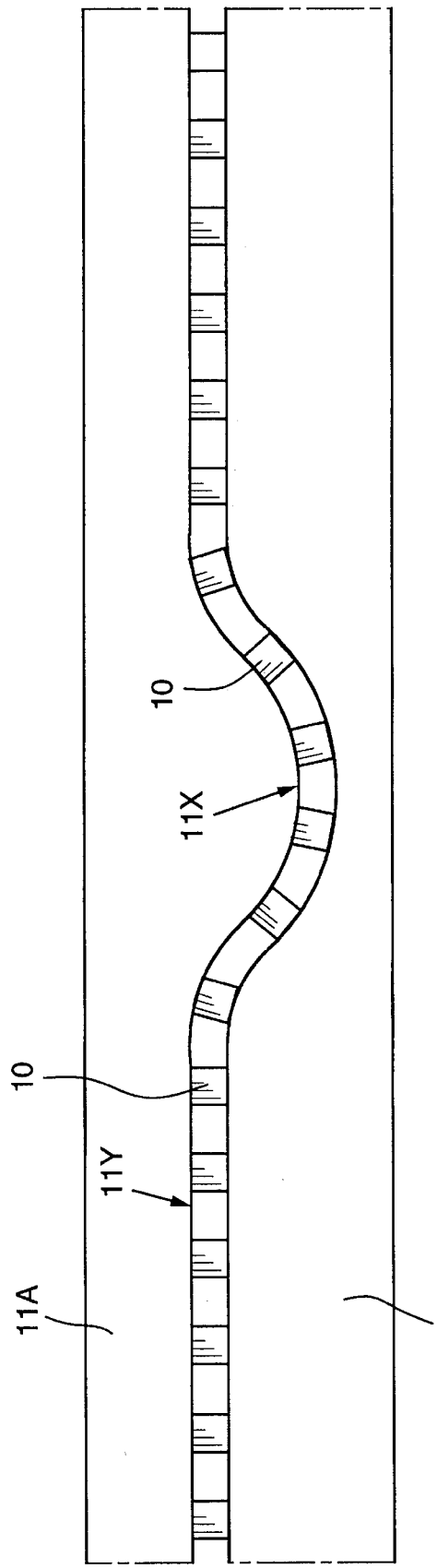
FIG. 22 is a view of generally cylindrical cam members 11A and 11B of FIG. 4, as they would appear if a cut (in a vertical plane in FIG. 1) were made through them, and they were then unrolled and flattened into the FIG. 22 plane.

As motor 4 rotates the assembly comprising shaft 2, member 2A, cam followers 10, and knives 6, each cam follower 10 rides in the gap (cam track 11) between upper cam member 11A and lower cam member 11B. Each of members 11A and 11B has a cylindrical outer surface. Track 11 has a dip 11X (shown in FIGS. 1 and 22) at the location of pit discharge station C, and raised portion 11Y at locations away from station C. The shape of track 11 is best shown in FIG. 22, which is a view of members 11A and 11B, as they would appear if a cut (in a vertical plane) were made through them, and they were then unrolled and flattened into the FIG. 22 plane.

As each cam follower 10 rides through dip 11X of track 11, the knife 6 attached thereto is forced downward (end 10A of the cam follower slides down along channel 50) into engagement with a prune in one of the chuck assemblies (as shown in FIG. 2). Then, as the cam follower 10 continues to ride in track 11 from dip 11X to portion 11Y, the knife 6 attached thereto is forced upward (end 10A of the cam follower slides up along channel 50) out of engagement with the prune.

Figure 23:
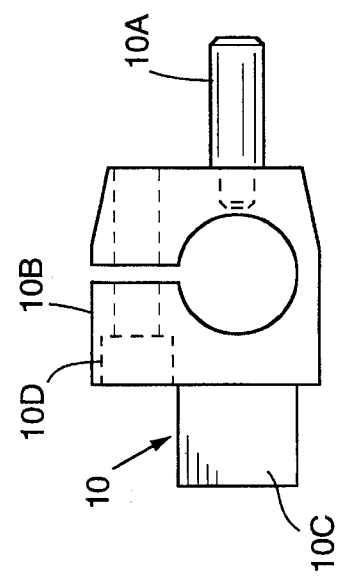
FIG. 23 is a top elevational view of one cam follower 10 of the type shown in FIGS. 4 and 22.

A preferred embodiment of cam follower 10 is shown in FIG. 23. In this embodiment, member 10 has a central portion 10B adapted to be placed around one of knives 6 (each knife 6 has a generally cylindrical cross-section), and then tightened in place by advancing a bolt through threaded channel 10D extending through portion 10B. End portion 10A is fixedly attached to one face of portion 10B, so that end portion 10A can slide up and down along the channel 50 associated with the knife 6. Block-shaped end portion 10C is fixedly attached to the opposite face of portion 10B, so that end portion 10C can slide along cam track 11 between upper cam member 11A and lower cam member 11B as described above.

Figure 15:
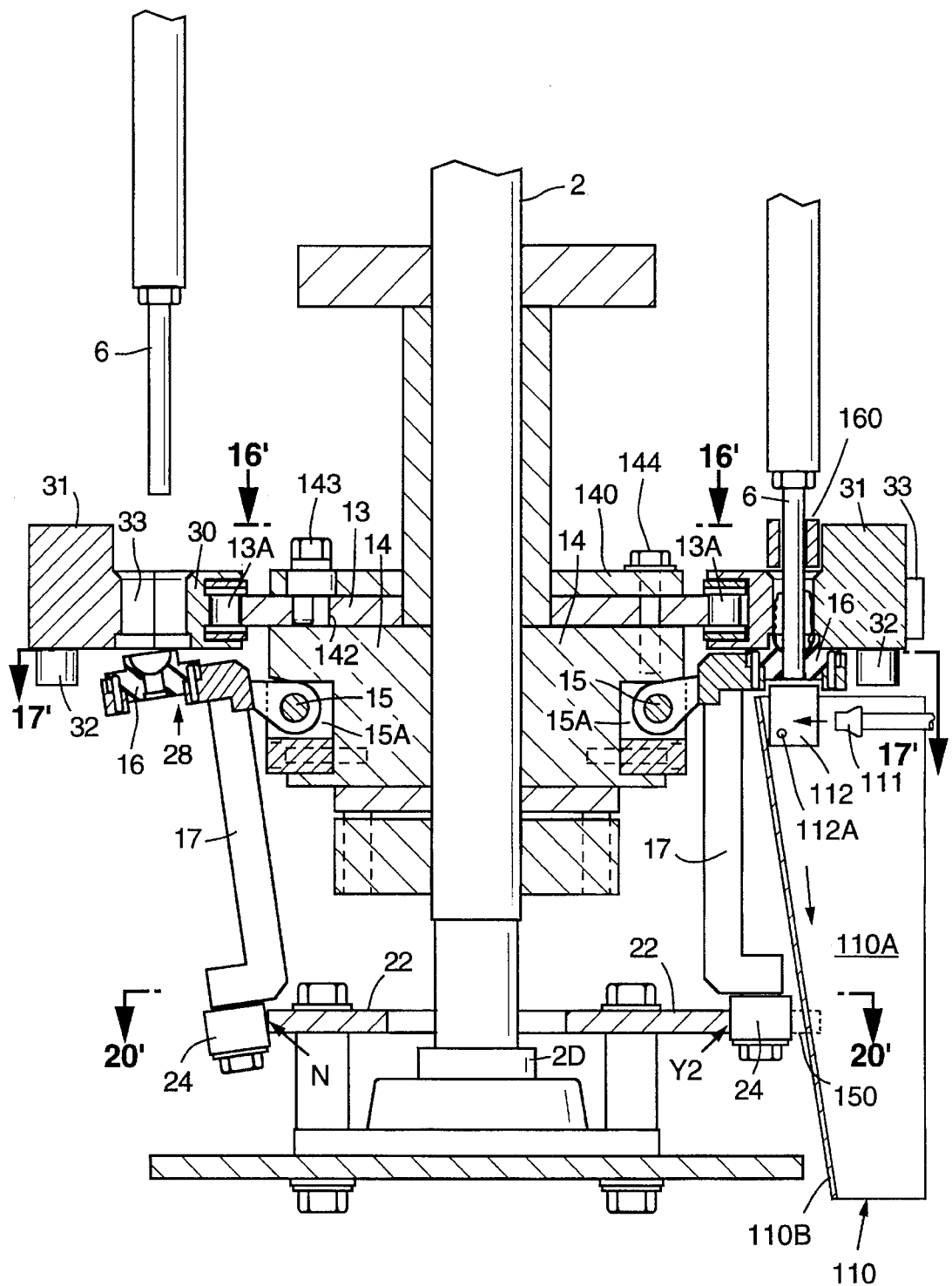
FIG. 15 is a side cross-sectional view of a portion of the pitting turret of the FIG. 1 apparatus.
Figure 17:
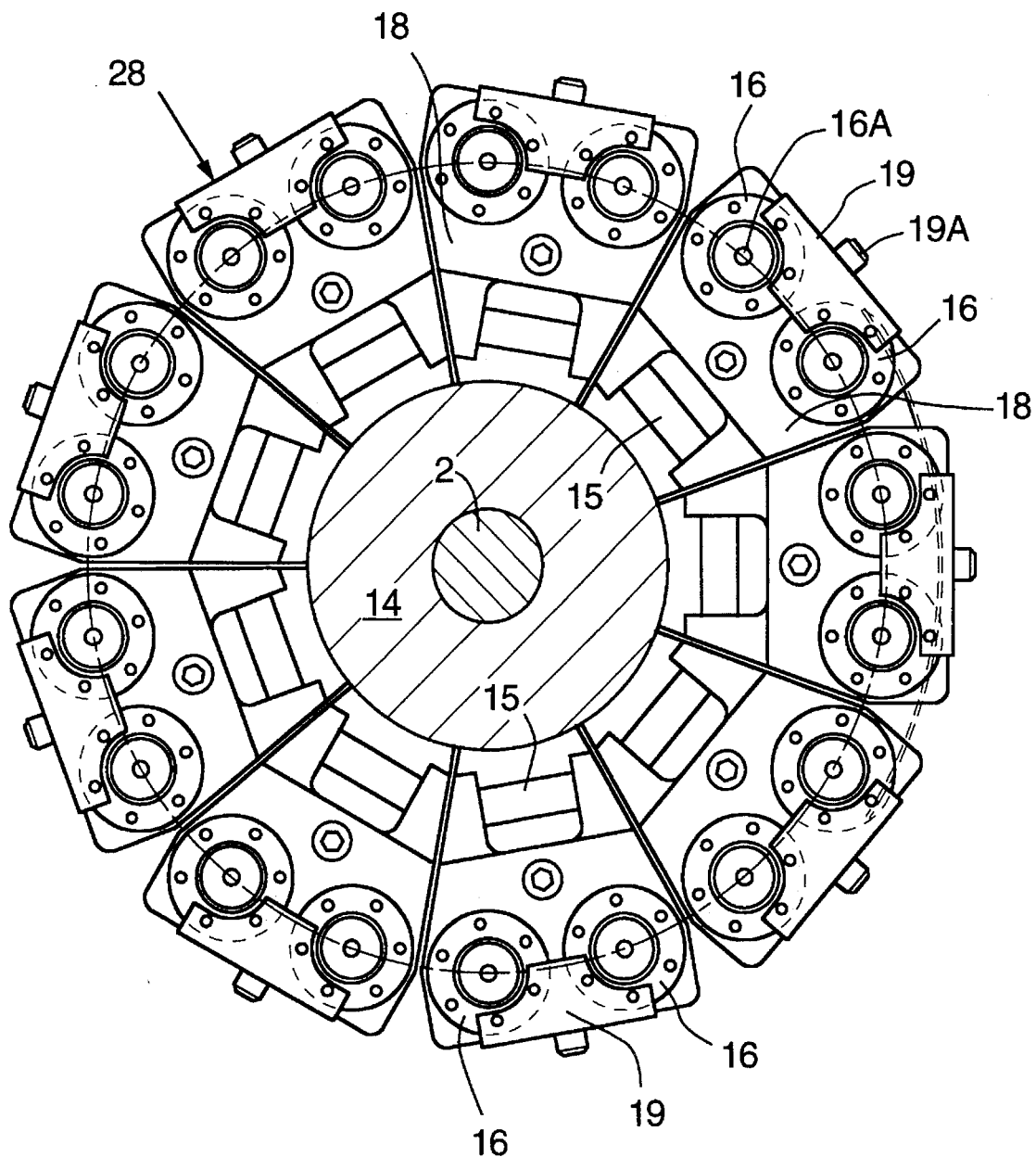
FIG. 17 is a cross-sectional view of a portion of the pitting turret of FIG. 15, in the plane determined by line 17'—17' of FIG. 15.

Pitting turret 12 also includes support member 14 (fixedly attached to shaft 2, as shown in FIG. 15), and pitting rubber holder 28 which is pivotally attached to member 15A by pivot pins 15 (member 15A is in turn fixedly attached to member 14). As best shown in FIG. 17, holder 28 includes eighteen identical pitting rubbers 16 and nine identical pitting rubber mounts 18. Each pitting rubber 16 is preferably made of elastic material such as rubber, has a shape (e.g., the preferred shape shown in FIG. 2 and FIG. 19) for receiving and restraining each prune 7 as one of knives 6 presses the prune against rubber 16, and has a hole 16A extending through its center (for admitting pitting knife 6 and allowing pit 8 of the prune to escape out from within the prune as shown in FIG. 2). As described below, each rubber 16 is removably mounted to the apparatus simply by pressing it into a recessed portion 18A of mount member 18 (shown in FIG. 18). This is done by inserting cylindrical ridge 16C of rubber 16 into the recessed portion. Ridge 16C has sufficient length (in the vertical direction in FIG. 19) so that cup 16D of rubber 16 extends sufficiently far out of recessed portion 18A for knife 6 to press prune 7 forcefully against cup 16D and push the prune's pit all the way through hole 16A.

Although the term "pitting rubber" is used herein, including in the claims, to denote an element for supporting an article being pitted, it is not essential that such element be composed of natural or synthetic rubber. On the contrary, alternative embodiments of the invention employ pitting rubbers composed of other material such as resilient plastic.

Two rubbers 16 are mounted on each mount 18 by pressing each rubber 16 into a recessed portion 18A of mount 18 (shown in FIG. 18). Optionally, a hold down plate 19 is then placed over a portion of both rubbers 16 (as best shown in FIG. 17), and plate 19 is then fastened to mount 18 by screwing screw 19A (shown in FIG. 18) into threaded hole 18B of mount 18. However, for typical applications, it is unnecessary to use a hold down plate 19 and screw 19A to mount two rubbers 16 on mount 18 (and thus elements 19 and 19A are typically omitted from assembly 28). When any one of pitting rubbers 16 becomes worn or damaged, it can readily be removed and replaced simply (after removing the corresponding screw 19A and lifting the corresponding plate 19, if plate 19 and screw 19A are used). This replacement operation can be conveniently performed without manipulating in any way the chuck assemblies or any component of pitting turret 12 (other than the relevant mount 18), except by rotating holder 28 about its central vertical axis as necessary to move the rubber 16 to be replaced to a convenient position. One or both of the pitting rubbers 16 that are held by a hold down plate 19 can be replaced when the plate 19 has been removed.

Each mount 18 has two pin mounts 18C (shown in FIG. 18), and is pivotally mounted to block 15A by aligning mounts 18C with member 15A and then inserting pin 15 through aligned holes in member 15A and mounts 18C. Block 15A is fixedly attached to member 14 such as by screws.

One end of a cam follower arm 17 is fixedly connected to each mount 18, as best shown in FIG. 15. A slide block 24 is mounted at the other end of each arm 17. A cam plate 22 is fixedly attached to assembly 29. Assembly 29 is fixedly attached to frame 20. The lower end of shaft 2 is rotatably mounted to bearing portion 2D of assembly 29. Thus assembly 29, cam plate 22, and frame 20 remain stationary during rotation of the entire assembly comprising shaft 2, members 2A, 14, and 15A, knives 6, holder 28, pitting rubbers 16, and sprocket 13.

There are nine slide blocks 24 (one for each mount 18). Slide blocks 24 function as cam followers as they slide along the outer surface of cam plate 22 during rotation of shaft 2. The preferred shape for cam plate 22 is best shown in FIG. 20. When each block 24 slides along a portion of cam plate 22 having large radius (relative to the center of shaft 2), e.g., from position Y1 (shown in FIG. 20) to position Y2 (shown in FIGS. 15 and 20), the corresponding mount 18 pivots about pin 15 so that arm 17 is oriented substantially vertically (as is the right arm 17 in FIG. 15). This pivots the pitting rubbers 16 attached to the mount 18 up until they meet one of the chuck assemblies. This orientation (vertical orientation of arm 17) occurs when the chuck assembly and the pitting rubber are at pit discharge station C. The purpose of pivoting rubber 16 up into engagement with a chuck assembly at station C (as shown in FIG. 2) is to put rubber 16 in position in which it supports a prune being held between the fixed and sliding jaw of the chuck assembly while one of knives 6 engages the prune, and to prevent any portion of the prune from being squeezed through the space between pitting rubber 16 and the chuck assembly during the pitting operation.

With reference again to FIGS. 15 and 20, when each slide block 24 slides along a portion of cam plate 22 having small radius (relative to the center of shaft 2), e.g. when block 24 is at position N (shown in FIGS. 15 and 20), the corresponding mount 18 pivots about pin 15 so that arm 17 is oriented non-vertically (as is the left arm 17 in FIG. 15). This pivots the pitting rubbers 16 attached to the mount 18 downward so that they are separated from the chuck assemblies above them. This separation between rubbers 16 and the chuck assemblies provides easy access to the rubbers 16 (e.g., so that they can be removed and replaced as described above).

As shown in FIG. 20 (and FIG. 15), cam member 150 is also mounted in the plane of plate 22, at a such a position that each slide block 24 encounters member 150 after a pit has been ejected through the hole 16A through each of the pitting rubbers 16 associated with the slide block. The curved inner surface 150A of member 150 has a varying radial distance away from center of shaft 2, and this radial distance decreases with increasing angle around shaft 2 for the following reason. Between points Z1 and Z2 along plate 22 (which are encountered by each slide block 24 after the mount 18 associated with the block 24 has passed through pitting station C), member 150 positively pushes block 24 radially inward, thereby forcing the corresponding mount 18 to pivot about pin 15 so that arm 17 is oriented non-vertically (e.g., forcing each arm 17 into the position of the left arm 17 in FIG. 15), in turn pivoting the pitting rubbers 16 attached to the mount 18 downward to separate them from the chuck assemblies above them after the pitting rubbers 16 have passed through pitting station C. This prepares the chuck assemblies to undergo the pitted prune discharge operation at station D.

Cam plate 22 and cam member 150 are preferably made of metal (e.g., brass).

The outer surface (cam track) of cam plate 22 is shaped and oriented relative to the cam track defined by the space between cam members 21 and 36B (shown in FIG. 16) to solve timing problems in the following sense. Due to the shape and orientation of both cam tracks, the configuration of a pitting rubber 16 and a corresponding chuck assembly is always synchronized with the position of a corresponding one of pitting knives 6. More specifically, blocks 15A are mounted in alignment with channels 2B through member 2A so that each rubber 16 is aligned with one of knives 6, and the chuck assemblies are sized and mounted (and teeth 13A of sprocket 13 are aligned relative to blocks 15A) so that at pit discharge station C, one and only one chuck assembly is positioned between a pitting rubber 16 (below the chuck assembly) and a corresponding knife 6 (above the pitting rubber and chuck assembly). Each triplet of a knife 6, chuck assembly, and pitting rubber 16 rotates together as a unit through station C. As will be explained below, the alignment of teeth 13A of sprocket 13 relative to shaft 2 can be adjusted using eccentric bolt 143 and bolts 144 which extend through plate 140 and sprocket 13).

In other words, a portion of the path of each chuck assembly around pitting turret 12 coincides with a portion of the circular path of one of pitting rubbers 16, in that the pitting rubber moves together as a unit with the chuck assembly along a coinciding portion of their paths (a "common path" of the chuck assembly and pitting rubber). As each chuck assembly and pitting rubber translate along their common path, the knife 6 above the pitting rubber moves down (as it follows dip 11X in track 11) toward the rubber (to eject a pit from a prune being held by the chuck assembly which rests on the rubber) and the knife then moves up away from the rubber and pitted article. As shown in FIG. 2, while prune 7 is held in a substantially vertical orientation between faces 34 and 35 of the jaws of one chuck assembly, and while prune 7 is supported by pitting rubber 16, pitting knife 6 is brought into engagement with prune 7 to push pit 8 out from within prune 7 and through opening 16A in the center of pitting rubber 16. The ejected pit 8 is discharged into pit chute 110 (shown in FIGS. 15 and 16) disposed below station C.

Chute 110 has a central surface 110B (shown in FIG. 16) which preferably has the curvature of a portion of the surface of a cone directs the falling pits downward into a bin, a vertically oriented, trailing end surface 110A (shown in FIGS. 15 and 16), and a vertically oriented, leading end surface 110C (shown in FIG. 16). As shown in FIG. 15, wiping blade 112 (preferably made of hard plastic) is fixedly mounted (e.g., by bolts) to the top of surface 110A in a position for knocking away a pit from each pitting knife 6 that rotates past blade 112, so that the pit is freed to fall down into chute 110. Preferably, a nozzle 111 is mounted to the apparatus so as to direct a jet of water toward blade 112 (and the adjacent portions of chute 110) during pitting operations, to help clear pits from blade 112 and the adjacent portions of chute 110.

Also preferably, one or more vertically oriented blades 113 (see FIG. 15) are mounted to surface 110A in positions for knocking away pits from pitting knives 6 as the knives rotate past chute 110 and blades 113, so that the pits are freed to fall down into chute 110.

An advantage of the preferred embodiment is that the pitting turret pits all the prunes at a single, visually and mechanically accessible location, thus permitting convenient use of a pit detection unit (during each pitting operation) for monitoring (optically or mechanically) the pitting operation to determine whether a pit is successfully ejected as a result of each engagement of a pitting knife with the article at the pitting station. For example, an optical sensor 112A can be mounted below the pitting station (e.g., through blade 112 as shown in FIG. 15) in a position for monitoring any pit that falls from the pitting rubber 16 of the pitting station.

As noted above, another advantage of the preferred embodiment is that the relative alignment (about the central axis of shaft 2) of the cam tracks at the pitting turret and sprocket teeth 13A solves timing problems in ensuring that each triplet of knife 6, chuck assembly, and pitting rubber 16 has the proper relative alignment at all times (e.g., to compensate for manufacturing tolerances in the component parts of pitting turret 12). To control such relative alignment, plate 140 is preferably mounted above sprocket 13 (as shown in FIG. 15) to permit adjustment of the angular orientation of sprocket 13 relative to member 14 (and thus relative to shaft 2). Plate 140 has seven holes (each having a circular periphery) therethrough. The first six of these holes are for receiving straight bolts 144, and the seventh is for receiving eccentric bolt 143. Sprocket 13 has one hole 142 (having a radially oriented elongated periphery) therethrough and six holes 141 (each having an elongated, circumferentially oriented periphery) therethrough. When hole 142 generally aligned with the seventh hole of plate 140 (with eccentric bolt 143 through these generally aligned holes (as shown in FIG. 16), each of holes 141 is generally aligned with one of the other six holes through plate 140 (so that a bolt 144 can be inserted through each of the latter six pairs of aligned holes).

Figure 16A:
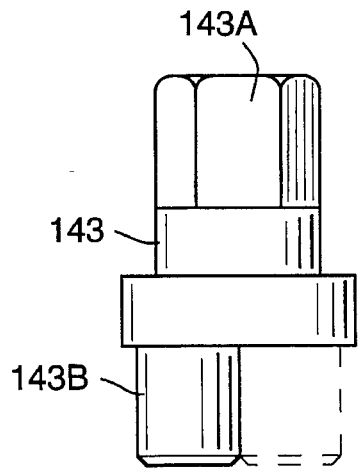
FIG. 16A is a side elevational view of eccentric bolt 143 (shown in FIGS. 15 and 16).

Eccentric bolt 143 (shown in FIGS. 15 and 16, but better shown in FIG. 16A) is provided to adjust the orientation of sprocket 13 relative to shaft 2 as follows. Bolt 143 has hexagonal end portion 143A and pin 143B at its opposite end, and the central longitudinal axes of portion 143A and pin 143B are parallel but offset. When member 14 has been fixedly mounted to shaft 2, sprocket 13 has been placed on member 14, and plate 140 has been placed on sprocket 13 as shown in FIG. 15, the angular orientation of sprocket 13 relative to plate 140 (and thus relative to member 14 and shaft 2) can be changed by rotating bolt 143 which extends through the "seventh" hole of plate 140 into hole 142 of sprocket 13. By rotating hexagonal end 143A of bolt 143, pin 143B of bolt 143 moves radially along hole 142 and the angular orientation of plate 140 rotates relative to sprocket 13. When the desired relative angular orientation is been reached, this orientation is preserved by screwing bolts 144 into the six other generally aligned hole pairs through plate 140 and sprocket 13.

Next, with reference to FIGS. 2 and 16, we describe in more detail the function of cam member 21 and the portion of cam member 36B opposite cam member 21. Cam member 21 is mounted around a portion of turret 12 (in the plane of rollers 32) and cam member 36B is mounted around turret 12 (in the plane of rollers 32) as shown in FIG. 16. The space between cam member 21 and 36B is a cam track (a portion of above-discussed cam track 36) which guides roller 32 of the sliding jaw of each chuck assembly around turret 12. FIG. 16 shows two chuck assemblies in positions Y along member 21 (at pit discharge station C) at which the radius between the center of track 36 and the center of shaft 2 is at a minimum (the inner peripheral edge of member 21 at positions Y is separated by a small radial distance from the center of shaft 2). Thus, rollers 32 of the chuck assemblies in positions Y are minimally separated from shaft 2 so that both chuck assemblies are closed (in the sense that faces 34 of jaw 30 abut faces 35 of jaw 31, and arms 33 of fixed jaw 30 extend as far as possible through jaw 31, as shown in FIG. 2). This closed configuration of the chuck assemblies causes each chuck assembly to grip tightly a prune carried thereby during the pitting operation.

FIG. 16 also shows a chuck assembly in position X (just before pit discharge station C along the closed path of the chuck assembly), at a point at which the radius between the center of track 36 and the center of shaft 2 is at a maximum (the inner peripheral edge of member 21 at position X is separated by a large radial distance from the center of shaft 2). Thus, roller 32 of the chuck assembly in position X is maximally separated from shaft 2 and the chuck assembly is open (in the sense that faces 34 of jaw 30 are maximally separated from faces 35 of jaw 31, and arms 33 of fixed jaw 30 do not extend fully through jaw 31. This open configuration (at position X) relaxes the chuck assembly's grip on the prune carried thereby, allowing the pitting knife to push the prune downward to seat the prune on the pitting rubber below the chuck assembly.

Position X in FIG. 16 (at which each chuck assembly is opened) corresponds to position X in FIG. 20 at which cam 22 forces the corresponding arm 17 (arm 17 connected to mount 18 which supports the pitting rubber 16 below the chuck assembly) into a vertical orientation and pivots the corresponding pitting rubber 16 upward against the chuck assembly. Each of positions Y in FIG. 16 (at which a closed chuck assembly grips a prune) corresponds to position Y1 or Y2 in FIG. 20 at which cam 22 forces the corresponding arm 17 into a vertical orientation and pivots the corresponding pitting rubber 16 upward against the chuck assembly (as cam 22 also does at position X in FIG. 20).

As shown in FIG. 16, cam member 21 is shaped so that it first opens each chuck assembly translating along it (at position X), and then closes the chuck assembly. The portion of member 36B opposite member 21 is correspondingly shaped, so that track 36 defined by the gap between members 36B and 21 has substantially constant width.

As discussed above, after each chuck assembly passes through pit discharge station C, cam member 150 causes the pitting rubber 16 associated therewith to separate from the chuck assembly. After this operation, chain 9 continues to translate each chuck assembly to station D, where the pitted prune discharge operation is performed.

The pitted prune discharge operation at station D has been described above with reference to FIG. 11. To summarize, the portion of cam track 36 which extends through station D directs the roller 32 of each chuck assembly away from the corresponding fixed jaw (30 or 30'), so that the each chuck assembly is open (with the fixed jaw separated from the sliding jaw) so that the jaws do not exert force on the pitted prune in opposition to the ejecting force exerted on the pitted prune by wheel 26. At station D, a jet of water (or pressurized air) escaping from nozzle 104 ejects each pitted prune from the opened jaws of each chuck assembly translating past nozzle 104, so that the ejected pitted prune will fall into product discharge chute 106.

Then, each chuck assembly continues to translate past a second jet of water (or pressurized air) escaping from second nozzle 105. This jet of fluid is directed downward into chute 107. Preferably, above-mentioned wall 120 (fixedly attached to frame 20) extends to a location immediately downstream (along track 36) from nozzle 105 and chute 107. With wall 120 so positioned, prune material (e.g., fragments of a prune) clinging to a chuck assembly (after the assembly has been washed by fluid from nozzle 104) is dislodged from (wiped off) the chuck assembly by a portion of wall 120 (as the chuck assembly translates past said portion of wall 120). The fluid jet from nozzle 105 washes the dislodged prune material away from the chuck assembly, so that the material falls into waste chute 107.

Figure 25:
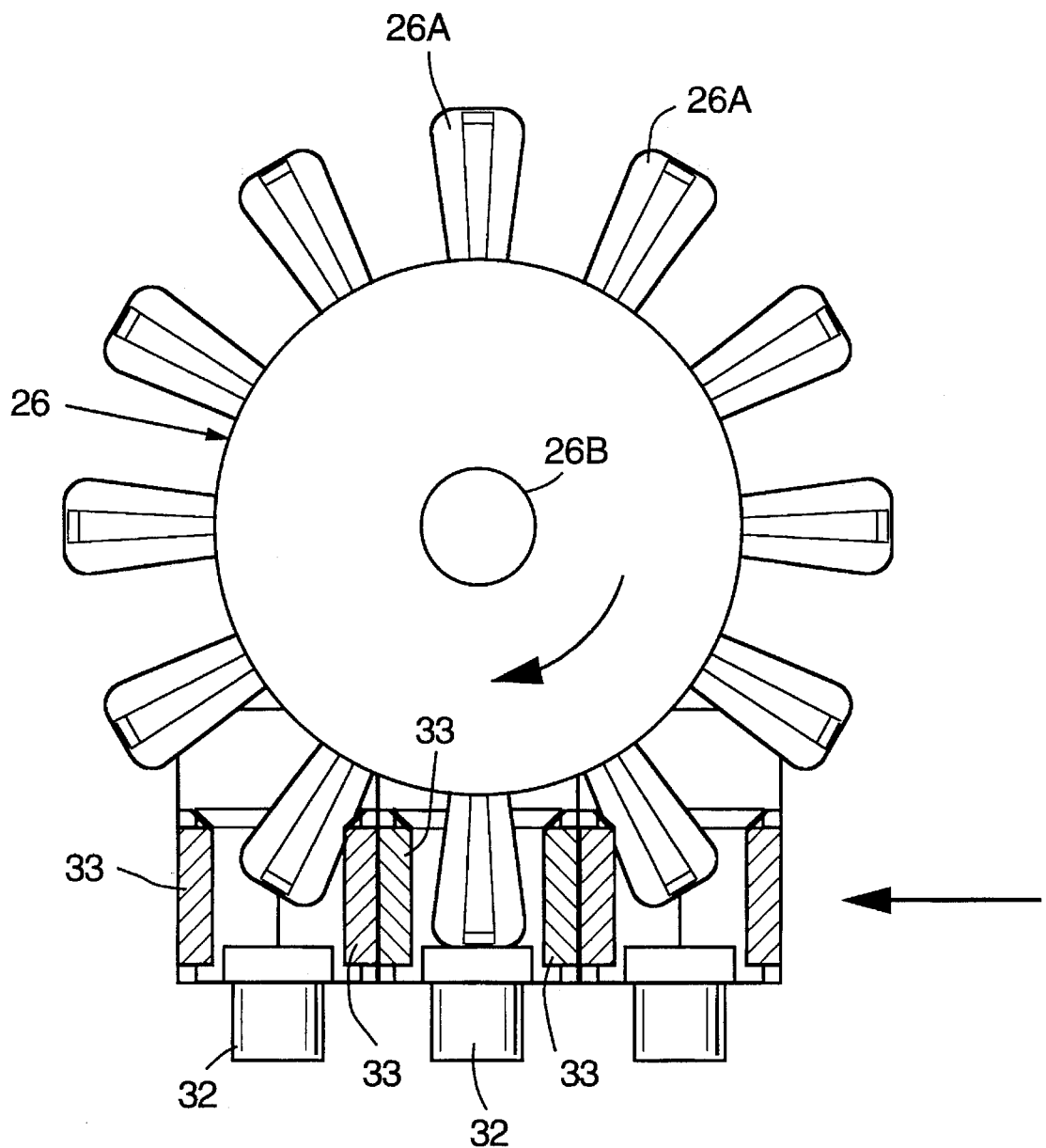
FIG. 25 is a cross-sectional view of knockout wheel 26 of FIG. 24, in the plane determined by line 25'—25' of FIG. 24.
Figure 26:
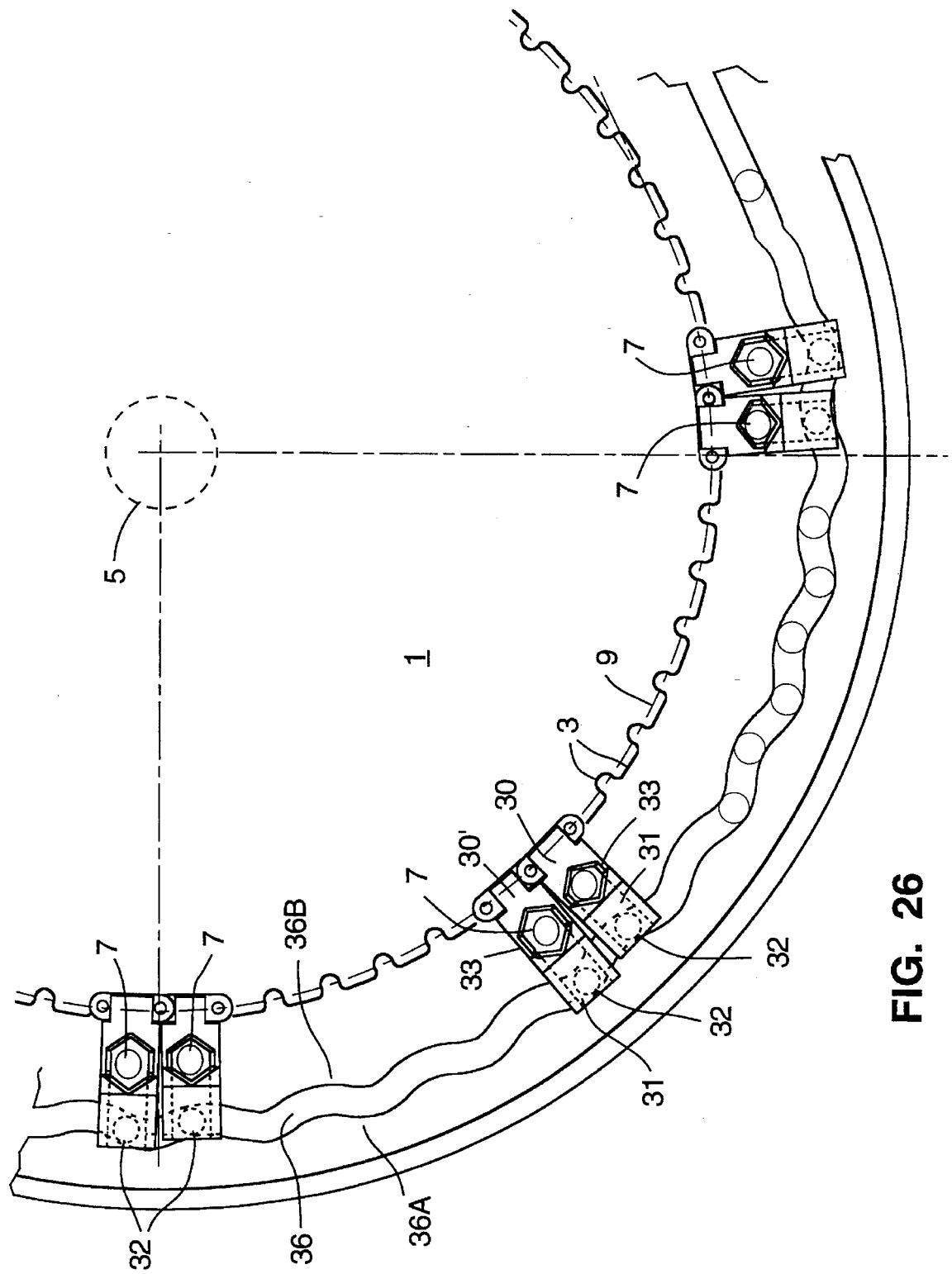
FIG. 26 is a top elevational view of a portion of the feed disk assembly of the FIG. 24 apparatus.

We next describe an alternative embodiment of the invention with reference to FIGS. 24–26. Those elements of the alternative embodiment that are identical to elements of the above-described preferred embodiment are identically numbered, and the description thereof will not be repeated below with reference to FIGS. 24–26. The alternative embodiment of FIGS. 24–26 differs in several respects from that of the above-described preferred embodiment: only one pair of adjustable cam members (37 and 38) is provided around a portion of disk 1 (as described above with reference to FIGS. 13 and 14); cam member 5A' of FIG. 24 is conical (and does not have flat faces 5B as does corresponding member 5A of FIG. 3); prune distributing elements 108, 130, 131, and 132 are omitted (although some or all of them can be included in variations on the embodiment of FIGS. 24–26); chute 100 is omitted; and the entire portion of cam track 36 around disk 1 from station A through station B has a radius (relative to the center of hub 5) which varies sinusoidally. In contrast, the preferred embodiment has a circular cam track 36 extending from pivots 39A and 40A through station B as shown in FIG. 3.

As shown in FIG. 24, cam track 36 of the alternative embodiment is determined by cam members 36A, 36B, 37, and 38 mounted around a portion of disk 1 (in the plane of rollers 32 of the chuck assemblies), cam members 36A and 36B extending between disk 1 and turret 12 (also in the plane of rollers 32), and cam members 36B and 21 extending around turret 12 in the plane of rollers 32.

The portion of cam track 36 between stations A and B (shown in FIG. 24) has a radius (relative to the center of hub 5) which varies sinusoidally. The purpose of this sinusoidal variation is to urge one prune to seat itself in a vertical orientation (with the longest axis of the prune oriented vertically) between the fixed and sliding jaw of each chuck assembly, as in the above-described preferred embodiment.

Rather than employing a fluid jet from nozzle 104 to knock out the pitted prunes from the chuck assemblies at station D, the alternative embodiment employs knockout wheel 26 (best shown in FIG. 25) to perform this function. Wheel 26 is rotatably mounted to frame 20, at pitted prune discharge station D of the FIG. 24 apparatus, by horizontal shaft 26B (shown in FIG. 24 as well as in FIG. 25). Flexible rubber projections 26A are attached around the outer edge of wheel 26. Preferably, each of projections 26A is hollow and substantially cylindrical in shape (projections 26A can be equal-length segments of a rubber tube, or the like). As each chuck assembly translates past wheel 26, one of the projections 26A engages the pitted prune in the chuck assembly and ejects the pitted prune by pushing it down (away from the chuck assembly) into a chute (e.g., chute 106 shown in FIG. 11).

The portion of cam track 36 which extends through station D directs the roller 32 of each chuck assembly away from the corresponding fixed jaw (30 or 30'), so that the each chuck assembly is open (with the fixed jaw separated from the sliding jaw) so that the jaws do not exert force on the pitted prune in opposition to the ejecting force exerted on the pitted prune by wheel 26. The force exerted (to the left in FIG. 25) on projections 26A by arms 33 of the chuck assemblies (as the chuck assemblies move to the left in FIG. 25) causes wheel 26 to rotate clockwise (as viewed in FIG. 25), thus bringing different projections 26A into successive engagement with different chuck assemblies.

As noted, the entire portion of cam track 36 around disk 1 from station A through station B in the embodiment of FIGS. 24–26 has a radius (relative to the center of hub 5) which varies sinusoidally. A section of this cam track 26 portion is shown in FIG. 26. The purpose of this sinusoidal variation is to urge one prune to seat itself in a vertical orientation (with the longest axis of the prune oriented vertically) between the fixed and sliding jaw of each chuck assembly. Thus, as shown in FIG. 16, the jaws of each chuck assembly can grip a prune at points along track 36 where pin 32 is radially near to hub 5, and the jaws of each chuck assembly do not grip a prune at points along track 36 where pin 32 is radially far from hub 5. Also, considered together, the faces 31E of sliding jaws 31 (around the portion of track 36 whose radius varies sinusoidally) define a "live wall." The live wall oscillates radially (relative to hub 5 of disk 1) to promote the guiding of prunes into the space between the jaws of each chuck assembly.

It is contemplated that any of a wide variety of articles may be processed by the inventive apparatus. For specificity, the invention has been described in embodiments suitable for processing prunes or dates. Such embodiments of the inventive apparatus includes apparatus (e.g., a portion of track 36 around disk 1 whose radius varies sinusoidally) for urging each prune into a vertical orientation in each chuck assembly (i.e., with the longest axis of the prune oriented vertically in the chuck assembly). In embodiments for removing pits from other articles, the orientation of each article being pitted may be unimportant, and accordingly, the embodiments need not include apparatus for urging the articles into a preferred orientation.

The foregoing is merely illustrative and explanatory of preferred embodiments of the inventive apparatus. Various changes in the component sizes and shapes, and other details of the embodiments described herein may be within the scope of the appended claims. As just one example, in alternative embodiments of the invention, a chain (to which chuck assemblies are attached) is looped around a feed unit and a pitting turret, a motor actively drives the feed unit to rotate it about its hub (thus translating the chain), and the pitting turret is passively driven by the chain.

What is claimed is:

1. A pitting apparatus, comprising:

a pitting turret including a first chain drive surface, a pitting rubber assembly including pitting rubbers, and a pitting knife assembly;

a feed unit having a second chain drive surface;

a chain looped around the first chain drive surface and the second chain drive surface;

chuck assemblies attached along the chain; and a drive means coupled to one of the pitting turret and the feed unit for rotating said one of the pitting turret and the feed unit thereby translating the chain and the chuck assemblies along a process path and causing the other one of the pitting turret and the feed unit to rotate, wherein the pitting rubber assembly rotates with the pitting turret thereby translating the pitting rubbers along a closed pitting rubber path, a portion of the pitting rubber path coincides with a pitting portion of the process path, and each of the pitting rubbers translates with one of the chuck assemblies along said pitting portion.

2. The apparatus of claim 1, wherein the drive means is coupled to the pitting turret, the apparatus includes N pitting rubbers, where N is a number greater than one, the pitting knife assembly includes N pitting knives, and the pitting knife assembly rotates with the pitting turret thereby causing each of the pitting knives to translate along a closed knife path.

3. The apparatus of claim 2, also including:

a cam assembly defining a knife cam track, and wherein each of the pitting knives has a blade portion, each of the pitting rubbers has an opening for receiving the blade portion of one of the pitting knives, the pitting knife assembly includes a cam follower attached to each of the pitting knives, and each said cam follower rides along the knife cam track during rotation of the pitting knife assembly, thereby directing the blade portion of the pitting knife attached thereto through one of the chuck assemblies and the pitting rubber translating with said one of the chuck assemblies at a pitting station along the pitting portion of the process path.

4. The apparatus of claim 3, wherein the pitting rubber assembly includes:

pitting rubber positioning means for raising each of the pitting rubbers at the pitting station and lowering each of the pitting rubbers away from the pitting station.

5. The apparatus of claim 4, wherein the pitting rubber assembly includes:

a set of pitting rubber holders;

an arm for each of the pitting rubber holders, each said arm having a first end attached to one of the holders and a second end to which a second cam follower is attached; and wherein the pitting rubber positioning means includes a cam plate along which each said second cam follower rides, wherein the cam plate exerts a force on each said second cam follower which raises each of the pitting rubbers at the pitting station.

6. The apparatus of claim 5, wherein the pitting rubber positioning means also includes a second cam member spaced from the cam plate, wherein the second cam member has a curved cam surface for engaging sequentially each said second cam follower, the curved cam surface exerts a pitting rubber lowering force on each said second cam follower that translates along said curved cam surface, and the pitting rubber lowering force lowers each of the pitting rubbers at a location away from the pitting station.

7. The apparatus of claim 1, wherein the pitting rubber assembly includes:

a set of pitting rubber holders, wherein at least one of the pitting rubbers is removably mounted to each of the pitting rubber holders.

8. The apparatus of claim 7, wherein two of the pitting rubbers are removably mounted to each of the pitting rubber holders.

9. The apparatus of claim 8, wherein the pitting rubber assembly also includes:

an arm for each of the holders, each said arm having a first end attached to one of the holders and a second end to which a cam follower is attached.

10. The apparatus of claim 1, also including:

a first cam assembly extending along a portion of the process path and defining a first cam track along which a portion of each of the chuck assemblies rides.

11. The apparatus of claim 10, wherein each of the chuck assemblies includes a sliding jaw which rides in the first cam track and a fixed jaw attached to the chain.

12. The apparatus of claim 11, wherein the feed unit has a center of rotation, and the first cam track has a radially varying portion extending around at least a portion of the feed unit, where the distance of said radially varying portion from the center of rotation varies with angular position around the center of rotation.

13. The apparatus of claim 12, wherein the distance of said radially varying portion from the center of rotation varies sinusoidally.

14. The apparatus of claim 11, also including:

a second cam assembly which defines a knife cam track, wherein each of the pitting knives has a blade portion, each of the pitting rubbers has an opening for receiving the blade portion of one of the pitting knives, the pitting knife assembly includes a cam follower attached to each of the pitting knives, and each said cam follower rides along the knife cam track during rotation of the pitting knife assembly, thereby directing the blade portion of the pitting knife attached thereto through one of the chuck assemblies and the pitting rubber translating with said one of the chuck assemblies at a pitting station along the pitting portion of the process path, wherein the first cam track has a seating portion at the pitting turret, and wherein the seating portion is shaped so that as each chuck assembly translates along the seating portion, the sliding jaw of each said chuck assembly opens relative to the fixed jaw of said chuck assembly, just before said chuck assembly reaches the pitting station, and then closes relative to said fixed jaw at the pitting station.

15. The apparatus of claim 1, also including:

means for clearing non-seated articles from the chuck assemblies before said chuck assemblies reach the pitting turret.

16. The apparatus of claim 15, also including:

a first cam assembly extending along a portion of the process path and defining a first cam track along which a portion of each of the chuck assemblies rides, where each of the chuck assemblies includes a sliding jaw which rides in the first cam track and a fixed jaw attached to the chain, where the fixed jaw of each of the chuck assemblies is separated from the sliding jaw thereof by a volume, and where the means for clearing includes:

a wheel rotatably mounted in a position for clearing, from each of the chuck assemblies translating past said wheel, articles which extend at least partially out of the volume of said each of the chuck assemblies.

17. The apparatus of claim 15, wherein the means for clearing includes:

a blade fixedly mounted in a position for clearing, from each of the chuck assemblies translating past said blade, at least some of said non-seated articles from the chuck assemblies.

18. The apparatus of claim 15, wherein the means for clearing includes:

an assembly comprising vertically oriented lengths of flexible tubing mounted in a position so that the lengths of flexible tubing clear, from each of the chuck assemblies translating past said assembly, at least some of said non-seated articles from the chuck assemblies.

19. The apparatus of claim 1, wherein the feed unit has a center of rotation and includes a generally conical hub member fixedly mounted at the center of rotation.

20. The apparatus of claim 19, wherein the hub member has a conical tip centered at said center of rotation and at least one flat face.

21. The apparatus of claim 1, wherein each of the chuck assemblies includes a sliding jaw which rides in the first cam track and a fixed jaw attached to the chain, and also including:

pitted product ejection means, positioned along the process path, for exerting an ejection force between the sliding jaw and the fixed jaw of each of the chuck assemblies as said each of the chuck assemblies translates along the process path past the pitted product ejection means.

22. The apparatus of claim 21, wherein the pitted product ejection means includes:

nozzle means for directing a fluid jet between the sliding jaw and the fixed jaw of each of the chuck assemblies translating along the process path past said nozzle means.

23. The apparatus of claim 21, wherein the pitted product ejection means includes:

a knockout wheel positioned for ejecting pitted articles from the chuck assemblies after said chuck assemblies have translated through a pitting station along the process path.

24. The apparatus of claim 23, wherein the knockout wheel includes:

a central portion having an outer edge; and flexible projections extending out from the outer edge.

25. A pitting apparatus, including:

a pitting turret including a pitting rubber assembly having pitting rubbers;

a feed assembly;

a chain extending between the pitting turret and the feed assembly;

holders attached along the chain;

a drive means for translating the chain and the holders along a process path, wherein the pitting turret rotates when the holders translate along the process path, the pitting rubber assembly rotates with the pitting turret thereby translating the pitting rubbers along a closed pitting rubber path, a portion of the pitting rubber path coincides with a pitting portion of the process path, and each of the pitting rubbers translates with one of the holders along said pitting portion; and wherein the feed assembly includes means for loading articles onto the holders at a feed station along the process path.

26. The apparatus of claim 25, wherein the pitting turret also includes a pitting knife assembly including pitting knives, and the pitting knife assembly rotates with the pitting turret thereby causing each of the pitting knives to translate along a closed knife path.

27. The apparatus of claim 26, also including:

a cam assembly defining a knife cam track, and wherein each of the pitting knives has a blade portion, each of the pitting rubbers has an opening for receiving the blade portion of one of the pitting knives, the pitting knife assembly includes a cam follower attached to each of the pitting knives, and each said cam follower rides along the knife cam track during rotation of the pitting knife assembly, thereby directing the blade portion of the pitting knife attached thereto through one of the holders and the pitting rubber translating with said one of the holders at a pitting station along the pitting portion of the process path.

28. The apparatus of claim 27, wherein the pitting rubber assembly includes:

a pitting rubber positioning means for raising each of the pitting rubbers at the pitting station and lowering each of the pitting rubbers at points along the pitting rubber path away from the pitting station.

29. The apparatus of claim 28, wherein the pitting rubber assembly includes:

a set of pitting rubber holders, wherein at least one of the pitting rubbers is removably mounted to each of the pitting rubber holders.

30. The apparatus of claim 29, wherein two of the pitting rubbers are removably attached to each of the pitting rubber holders.

31. The apparatus of claim 26, wherein the apparatus includes N pitting rubbers, where N is a number greater than one, the pitting knife assembly includes N pitting knives, and the apparatus includes M holders, where M is a number greater than N.

32. The apparatus of claim 31, wherein N=18.

33. The apparatus of claim 26, also including:

a first cam assembly extending along a portion of the process path and defining a first cam track along which a portion of each of the holders rides, and wherein each of the holders is a chuck assembly including a sliding jaw which rides in the first cam track and a fixed jaw attached to the chain.

34. The apparatus of claim 33, wherein the feed assembly includes a feed unit having a center of rotation, and the first cam track has a radially varying portion extending around at least a portion of the feed unit, where the distance of said radially varying portion from the center of rotation varies with angular position around the center of rotation.

35. The apparatus of claim 34, wherein the distance of said radially varying portion from the center of rotation varies sinusoidally.

36. The apparatus of claim 33, wherein the first cam track has a seating portion at the pitting turret, and wherein the seating portion is shaped so that as each said chuck assembly translates along the seating portion, the sliding jaw of said chuck assembly opens relative to the fixed jaw thereof just before the chuck assembly reaches a pitting station and then closes relative to said fixed jaw at the pitting station.

37. A pitting apparatus, comprising:

a pitting turret including a pitting knife assembly and a first chain drive surface;

a rotatable feed unit having a second chain drive surface and a center of rotation and including a cam assembly defining a cam track;

a chain looped around the first chain drive surface and the second chain drive surface;

chuck assemblies attached along the chain, each of the chuck assemblies including a sliding jaw which rides in the cam track and a fixed jaw attached to the chain; and a drive means coupled to one of the pitting turret and the feed unit for rotating said one of the pitting turret and the feed unit thereby translating the chain and the chuck assemblies along a process path and causing the other one of the pitting turret and the feed unit to rotate, wherein each said sliding jaw rides along the cam track as the chuck assemblies translate along the process path, wherein the cam track has a radially varying portion extending around at least a portion of the feed unit, where the distance of said radially varying portion from the center of rotation varies with angular position around the center of rotation.

38. The apparatus of claim 37, wherein the distance of said radially varying portion from the center of rotation varies sinusoidally.

39. The apparatus of claim 37, wherein each of the sliding jaws has a face, each said face which is disposed along the radially varying portion of the cam track faces the center of rotation, the faces disposed along the radially varying portion of the cam track together comprise a living wall, and said living wall oscillates as the sliding jaws ride along the radially varying portion of the cam track.

* * * * *